United States Patent
Nakajo et al.

(10) Patent No.: US 8,247,987 B2
(45) Date of Patent: Aug. 21, 2012

(54) INDUCTION LAMP LIGHTING DEVICE AND ILLUMINATION APPARATUS

(75) Inventors: Akira Nakajo, Kadoma (JP); Hiroshi Kido, Kadoma (JP); Shinji Makimura, Kadoma (JP)

(73) Assignee: Panasonic Corporation, Osaka (JP)

( * ) Notice: Subject to any disclaimer, the term of this patent is extended or adjusted under 35 U.S.C. 154(b) by 555 days.

(21) Appl. No.: 12/457,864

(22) Filed: Jun. 24, 2009

(65) Prior Publication Data

US 2009/0322239 A1  Dec. 31, 2009

(30) Foreign Application Priority Data

| Jun. 25, 2008 | (JP) | 2008-166214 |
| Jun. 25, 2008 | (JP) | 2008-166259 |
| Aug. 26, 2008 | (JP) | 2008-217412 |

(51) Int. Cl.
- H05B 41/16 (2006.01)
- H05B 41/24 (2006.01)
- H05B 37/02 (2006.01)
- H05B 39/02 (2006.01)
- H05B 39/04 (2006.01)
- H05B 41/36 (2006.01)

(52) U.S. Cl. ............ 315/248; 315/209 R; 315/291

(58) Field of Classification Search ............ None
See application file for complete search history.

(56) References Cited

U.S. PATENT DOCUMENTS

| 5,502,423 A |   | 3/1996  | Okude et al. |         |
| 6,140,779 A | * | 10/2000 | Kanazawa et al. | 315/291 |
| 6,246,183 B1 | * | 6/2001 | Buonavita | 315/248 |
| 7,049,763 B2 | * | 5/2006 | Hochi et al. | 315/248 |
| 2007/0132399 A1 | * | 6/2007 | Makimura et al. | 315/248 |

OTHER PUBLICATIONS

Korean office action dated Jan. 6, 2011 and English summary thereof, 5 pages total.

* cited by examiner

*Primary Examiner* — Douglas W Owens
*Assistant Examiner* — Dedei K Hammond
(74) *Attorney, Agent, or Firm* — Bacon & Thomas, PLLC

(57) ABSTRACT

An induction lamp lighting device includes an induction coil arranged adjacent to an induction lamp; a direct current power supply circuit for outputting a direct current voltage; a high-frequency power supply circuit for converting the direct current voltage to an alternating current voltage and supplying the alternating current voltage to the induction coil; and a control circuit for controlling the direct current power supply circuit and the high-frequency power supply circuit. The control circuit performs a startup preparation operation by which to control the high-frequency power supply circuit so that, immediately after the alternating current voltage begins to be outputted from the high-frequency power supply circuit to the induction coil, the alternating current voltage is gradually increased to such a voltage value as not to generate arc discharge in the induction lamp and then kept at the voltage value for a specified time.

9 Claims, 26 Drawing Sheets

INDUCTION LAMP LIGHTING DEVICE AND ILLUMINATION APPARATUS

FIELD OF THE INVENTION

The present invention relates to an induction lamp lighting device and an illumination apparatus using to same.

BACKGROUND OF THE INVENTION

Conventionally, there are known induction lamp lighting devices for lighting an induction lamp that includes a bulb made of a transparent material, e.g., glass, and a discharge gas enclosed within the bulb (see, e.g., Japanese Patent Laid-open Publication Nos. 2005-158464 and 2005-158459). This kind of lighting device includes an induction coil arranged adjacent to the induction lamp and a power source unit for supplying high-frequency electric power to the induction coil. High-frequency electromagnetic fields are generated within the bulb of the induction lamp by the induction coil. If arc discharge is generated within the bulb by the high-frequency electromagnetic fields, the discharge gas thus excited emits ultraviolet rays. A fluorescent material is coated on the inner surface of the bulb of the induction lamp. The ultraviolet rays are converted to visible rays by the fluorescent material, as a result of which the induction lamp emits light.

When starting up the induction lamp, it has been customary in the prior art that the frequency of the alternating current power outputted from a high-frequency power supply circuit to the induction coil is kept constant for a specified time period immediately after starting the supply of the alternating current power to the induction coil.

However, relatively high electrical stresses are apt to be developed in circuit parts, if the frequency of the alternating current power is maintained constant immediately after starting the supply of the alternating current power.

Further, an output voltage of a direct current power supply circuit is gradually increased up to a predetermined normal voltage after starting up the induction lamp. Then the output voltage is maintained at the normal voltage.

When starting up the induction lamp, it has been customary in the prior art that the supply of the alternating current power from the high-frequency power supply circuit to the induction coil is started after the output voltage of the direct current power supply circuit is stabilized at the normal voltage.

If the supply of the alternating current power is started after stabilization of the output voltage of the direct current power supply circuit at the normal voltage as set forth above, however, relatively high electrical stresses are developed in circuit parts at the moment of starting the supply of the alternating current power from the high-frequency power supply circuit to the induction coil.

SUMMARY OF THE INVENTION

In view of the afore-mentioned circumstances, it is an object of the present invention to provide an induction lamp lighting device capable of reducing the electrical stresses developed in circuit parts at a startup time.

In accordance with an aspect of the present invention, there is provided an induction lamp lighting device, including: an induction coil arranged adjacent to an induction lamp; a direct current power supply circuit for outputting a direct current voltage; a high-frequency power supply circuit for converting the direct current voltage to an alternating current voltage and supplying the alternating current voltage to the induction coil; and a control circuit for controlling the direct current power supply circuit and the high-frequency power supply circuit, wherein the control circuit is configured to perform a startup preparation operation by which to control the high-frequency power supply circuit so that, immediately after the alternating current voltage begins to be outputted from the high-frequency power supply circuit to the induction coil, the alternating current voltage is gradually increased to such a voltage value as not to generate arc discharge in the induction lamp and then kept at the voltage value for a specified time.

DETAILED DESCRIPTION OF THE PREFERRED EMBODIMENTS

Hereinafter, preferred embodiments of the present invention will be described in detail with reference to the accompanying drawings.

First Embodiment

Figure 2:
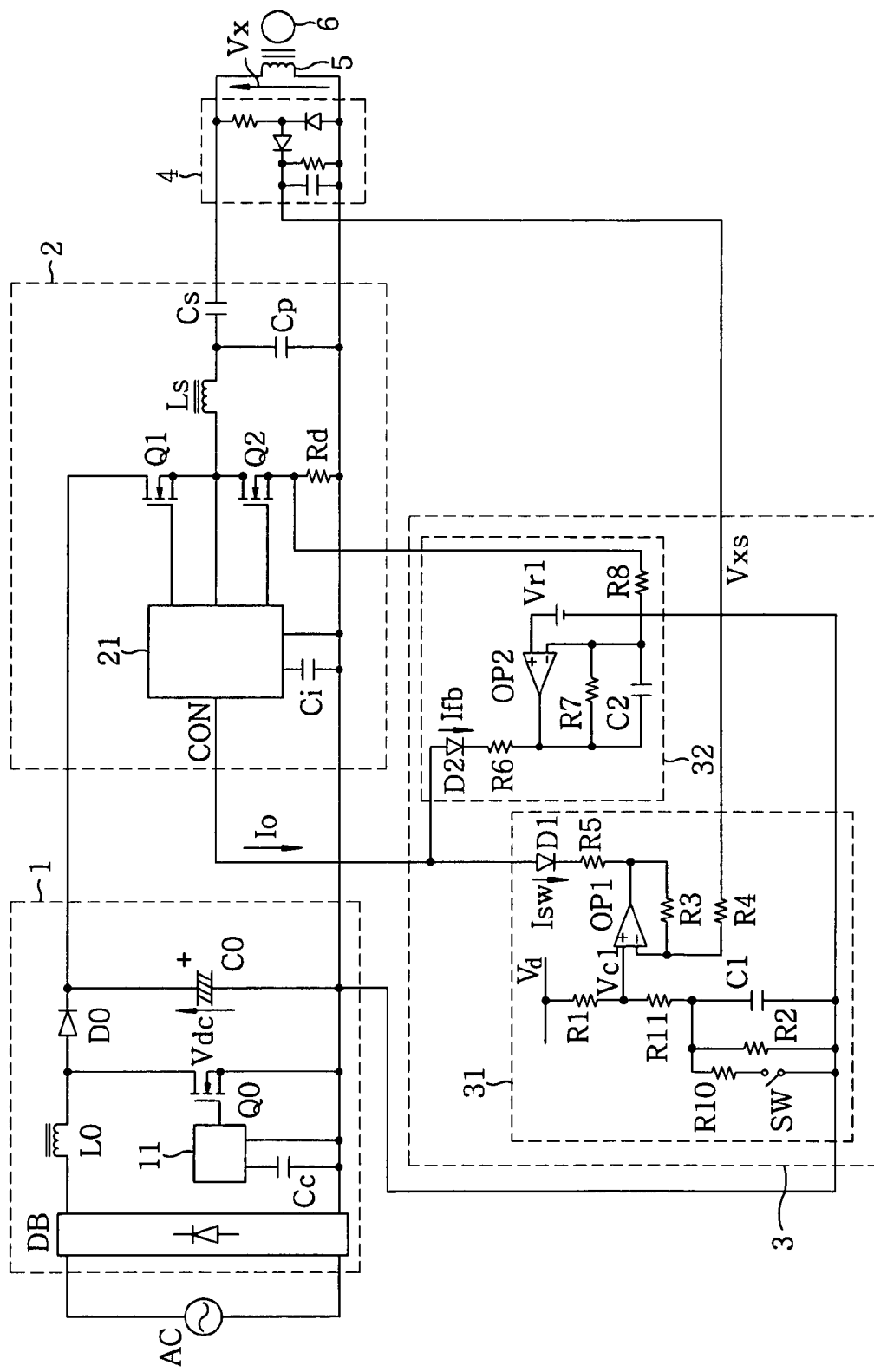
FIG. 2 is a circuit block diagram showing the lighting device of the first embodiment.

As shown in FIG. 2, an induction lamp lighting device of the present embodiment includes an induction coil 5 arranged adjacent to an induction lamp, a direct current power supply circuit 1 for converting the alternating current power supplied from an alternating current power supply AC to direct current power, a high-frequency power supply circuit 2 serving as a power supply circuit that converts the direct current power outputted from the direct current power supply circuit 1 to alternating current power and then outputs the alternating current power to the induction coil 5, a voltage detection circuit 4 for outputting a detection voltage Vxs, i.e., a direct current voltage having a voltage value that grows higher as the amplitude of the voltage (hereinafter referred to as a "coil voltage") Vx outputted from the high-frequency power supply circuit 2 to the induction coil 5 becomes greater, and a control circuit 3 for controlling the high-frequency power supply circuit 2 based on the detection voltage Vxs outputted from the voltage detection circuit 4.

Figure 3:
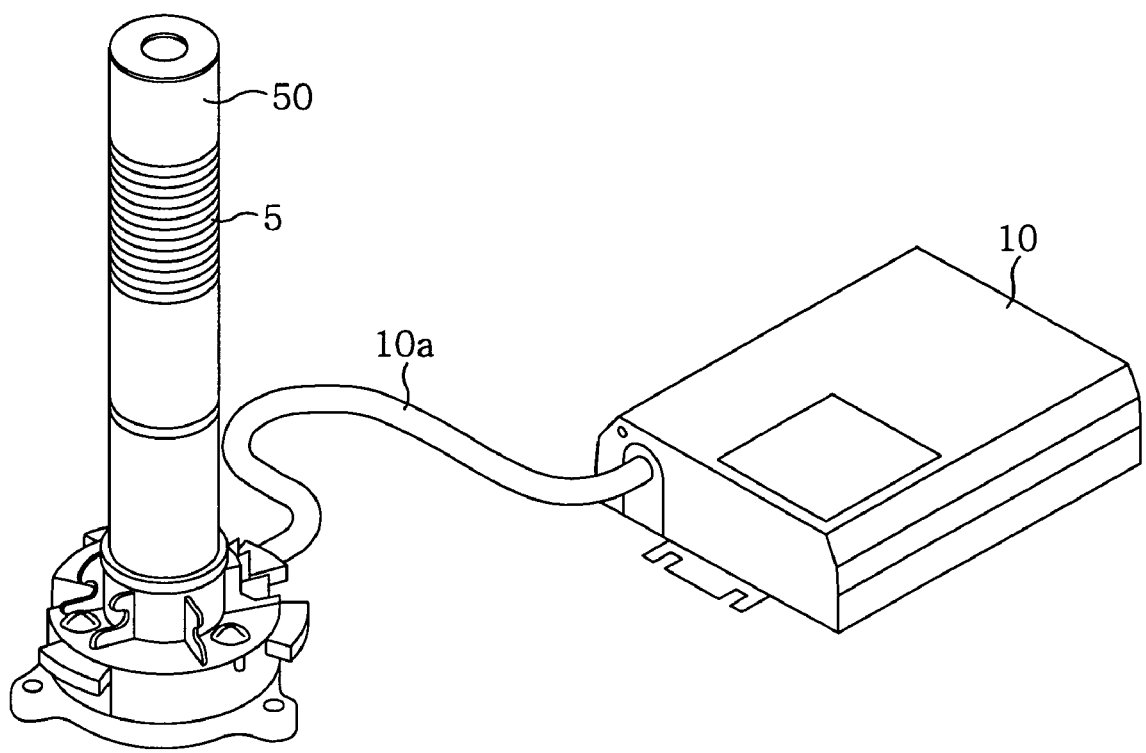
FIG. 3 is a perspective view showing one exemplary use of the lighting device of the first embodiment.

Referring to FIG. 3, the induction coil 5 is wound on a coupler 50 of cylindrical shape. In the example illustrated in FIG. 3, the induction lamp lighting device of the present embodiment is accommodated within a metal-made case 10 and is electrically connected to the induction coil 5 via a current feeding line 10a.

Figure 4:
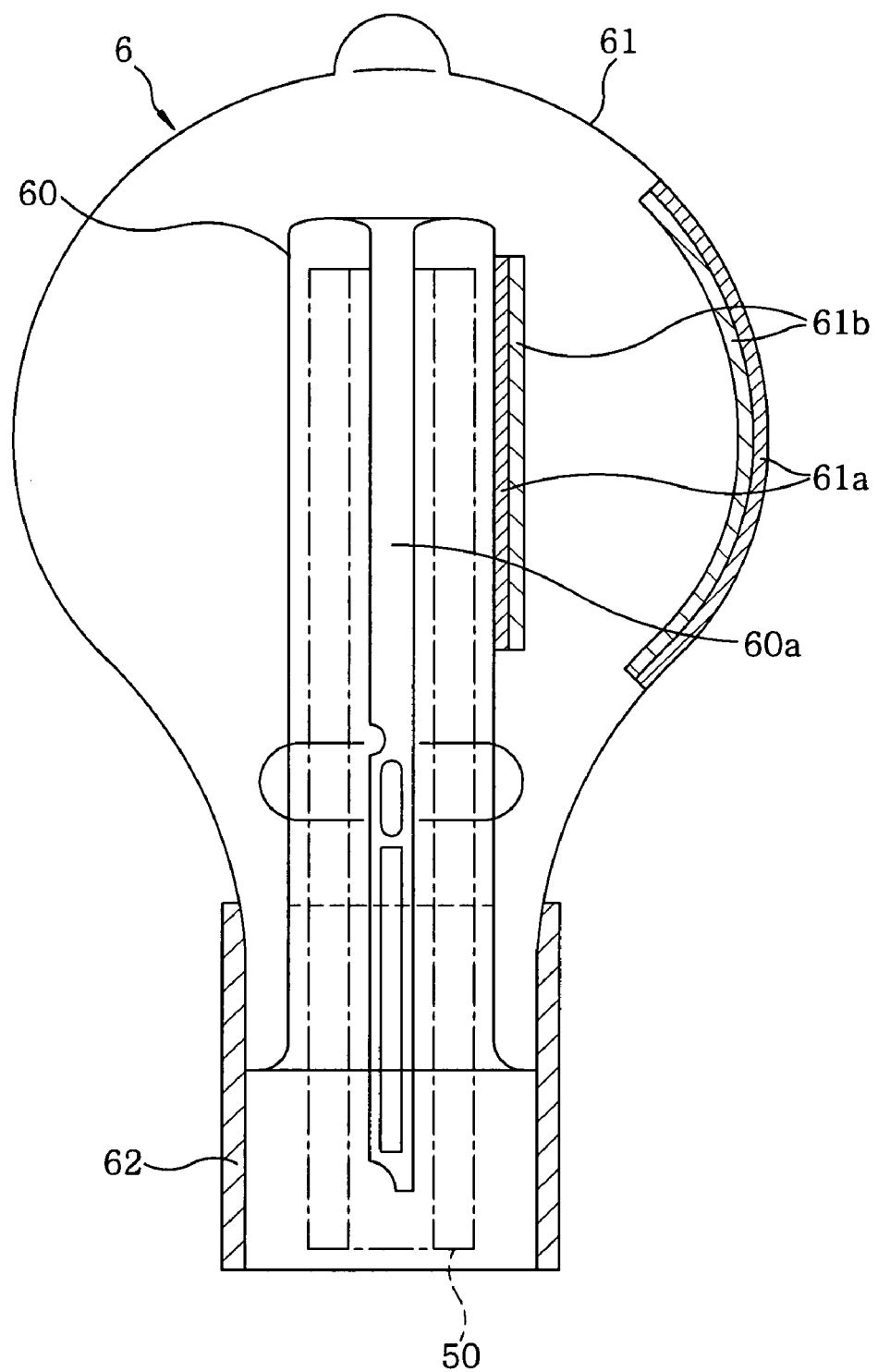
FIG. 4 is an explanatory view showing one example of the structure of an induction lamp.

As can be seen in FIG. 4, the induction lamp 6 includes a hollow bulb 61 made of a transparent material, e.g., glass, and provided with a cavity portion 60 formed therein, and a tubular brace 62 made of a synthetic resin and attached to the bulb 61 in such a fashion as to surround the mouth of the cavity portion 60. The coupler 50 is inserted into the cavity portion 60 so that the induction coil 5 can be arranged adjacent to the induction lamp 6. A discharge gas containing, e.g., an inert gas and a metal vapor, is enclosed within the bulb 61. A protrusion portion 60a inserted into the coupler 50 protrudes from the bottom surface of the cavity portion 60 of the bulb 61. A protection film 61b and a fluorescent film 61a are formed on the inner surface of the bulb 61. If arc discharge is generated within the bulb 61 by the high-frequency electromagnetic fields originating from the induction coil 5, ultraviolet rays are converted to visible rays by the fluorescent film 61a. Thus the induction lamp 6 emits light.

Figure 1:
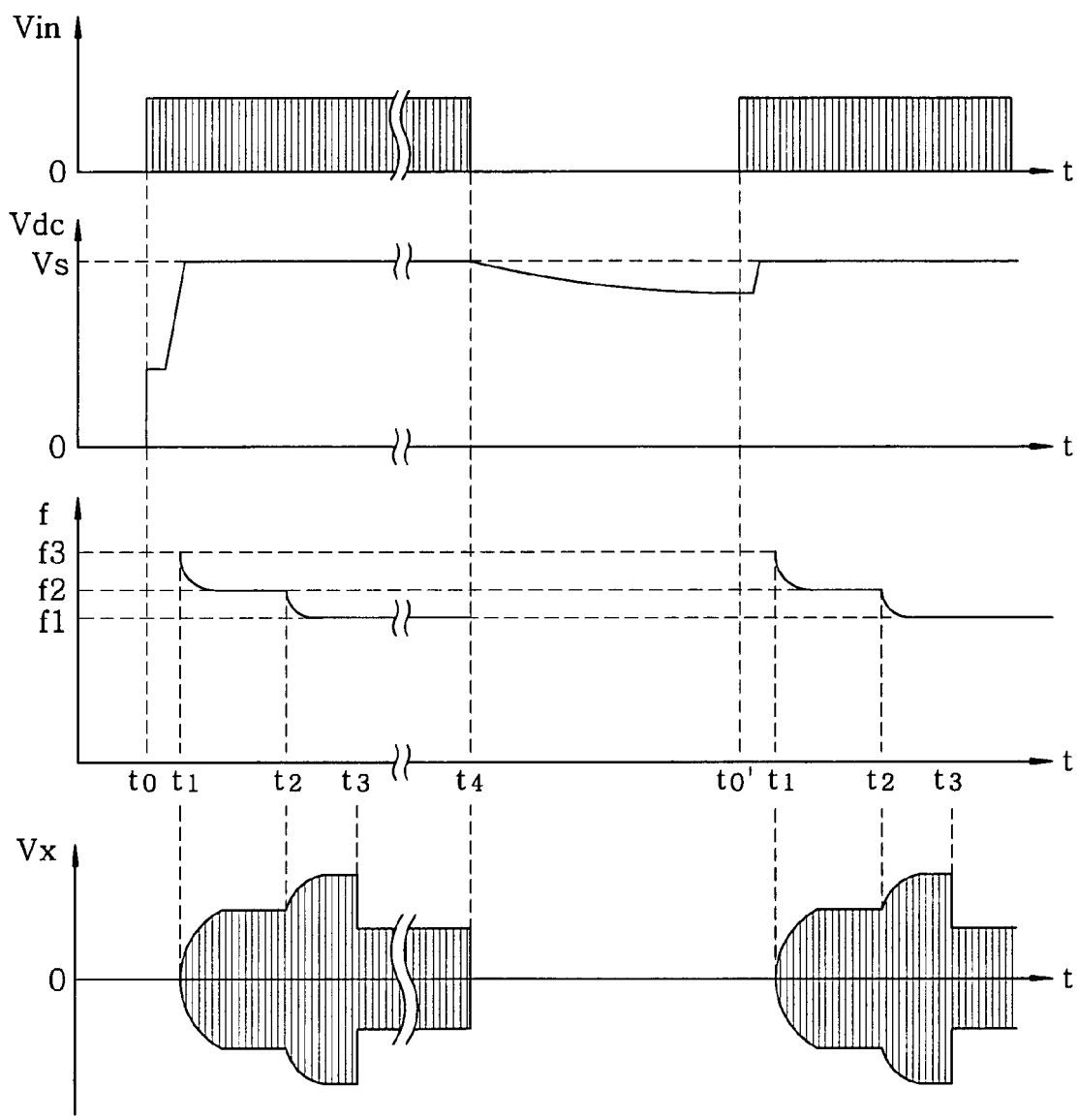
FIG. 1 is an explanatory view illustrating the operation of an induction lamp lighting device in accordance with a first embodiment of the present invention.

The direct current power supply circuit 1 is a well-known boosting converter that includes a diode bridge DB for full-wave rectifying the alternating current supplied from an alternating current power supply AC, a series circuit of an inductor L0, a diode D0 and an output capacitor C0, which is connected between the output ends of the diode bridge DB, a switching element Q0 connected between the junction point, at which the inductor L0 and the diode D0 are connected to each other, and the low-voltage output end of the diode bridge DB, and a voltage control unit 11 for on-off driving the switching element Q0 in such a duty ratio as to keep the opposite-end voltage Vdc of the output capacitor C0, i.e., the output voltage of the direct current power supply circuit 1 (hereinafter referred to as a "direct current voltage"), at a constant normal voltage Vs (see FIG. 1).

Figure 5:
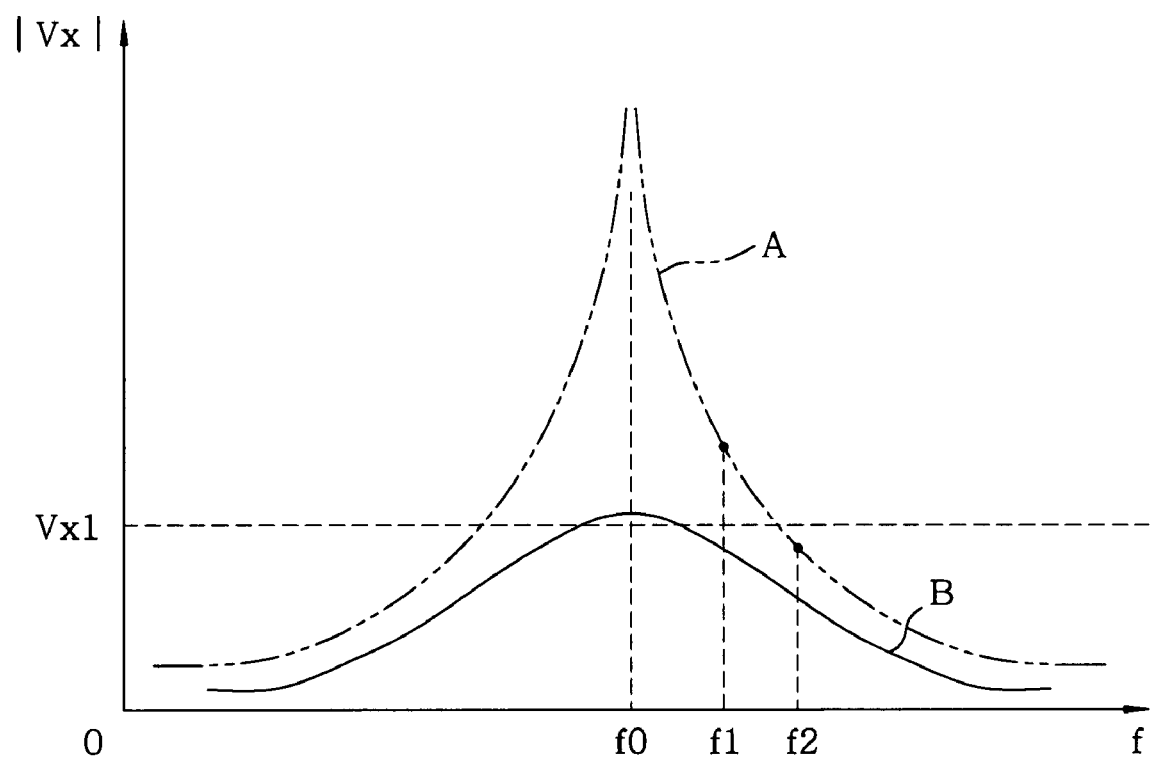
FIG. 5 is an explanatory view illustrating the relationship between an operation frequency and a coil voltage.

The high-frequency power supply circuit 2 includes a series circuit of switching elements Q1 and Q2 and a detection resistor Rd, which is connected between the output ends of the direct current power supply circuit 1, i.e., between the opposite ends of the output capacitor C0, an inductor Ls whose one end is connected to the junction point of the switching elements Q1 and Q2, a serial capacitor Cs whose one end is connected to the other end of the inductor Ls and whose the other end is connected to one end of the induction coil 5, a parallel capacitor Cp whose one end is connected to the junction point of the inductor Ls and the serial capacitor Cs and whose the other end is connected to the junction point of the detection resistor Rd and the induction coil 5, and a drive unit 21 for on-off driving the switching elements Q1 and Q2 in an alternating manner. By alternately turning on and off the switching elements Q1 and Q2, it is possible to switch the connection between the resonance circuit, which is composed of the inductor Ls, the serial capacitor Cs, the parallel capacitor Cp and the induction coil 5, and the direct current power supply circuit 1. The direct current power outputted from the direct current power supply circuit 1 is converted to high-frequency alternating current power by the resonance of the resonance circuit and then supplied to the induction coil 5. Each of the switching elements Q1 and Q2 is formed of an N-type FET. The drive unit 21 outputs a drive signal of rectangular waveform to the gates of the switching elements Q1 and Q2, thereby on-off driving the switching elements Q1 and Q2. The drive unit 21 is provided with a control terminal CON. The frequency (hereinafter referred to as an "operation frequency") f at which to turn on and off the switching elements Q1 and Q2 is set higher as the control current Io flowing out of the control terminal CON becomes greater. As can be seen in FIG. 5, it is typical that the operation frequency f is in a range higher than the resonance frequency f0 of the resonance circuit set forth above (hereinafter simply referred to as a "resonance frequency"). Therefore, as the control current Io becomes smaller and the operation frequency f grows lower, the amplitude of the coil voltage Vx is made greater, consequently increasing the electric power supplied from the high-frequency power supply circuit 2 to the induction coil 5. In FIG. 5, the upper curve A represents the relationship between the amplitude |Vx| of the coil voltage Vx and the operation frequency f when the direct current voltage Vdc is kept at the normal voltage Vs with the induction lamp 6 extinguished. The lower curve B represents the relationship between the amplitude |Vx| of the coil voltage Vx and the operation frequency f when the direct current voltage Vdc is kept at the normal voltage Vs with the induction lamp 6 lighted.

The voltage detection circuit 4 is formed of a current-rectifying diode, a voltage-dividing resistor and a smoothening capacitor. The voltage detection circuit 4 outputs a detection voltage Vxs, i.e., a direct current voltage having a voltage value that grows higher as the amplitude of the coil voltage Vx becomes greater.

The control circuit 3 includes a sweep circuit 31 for performing a sweep operation by which the operation frequency f is gradually reduced at the time of starting up the induction lamp 6 to thereby gradually increase the electric power outputted from the high-frequency power supply circuit 2 to the induction coil 5.

The sweep circuit 31 includes an operational amplifier OP1 whose inverting input terminal is connected to the output terminal thereof through a feedback resistor R3 and also to the output end of the voltage detection circuit 4 through an input resistor R4. The output terminal of the operational amplifier OP1 is connected to the control terminal CON of the drive unit 21 through a series circuit composed of a backflow-preventing diode D1 and an output resistor R5. The sweep circuit 31 further includes a series circuit composed of resistors R1 and R11 and supplied with a constant voltage Vd at one end thereof, a series circuit composed of a resistor R10 and a switch SW, one end of which is connected to the other end of the series circuit of the resistors R1 and R11 (namely, one end of the resistor R11) and the other end of which is connected to the ground, and a parallel circuit composed of a resistor R2 and a capacitor C1. The non-inverting input terminal of the operational amplifier OP1 is connected to the junction point of the resistors R1 and R11. In the sweep circuit 31 of the present embodiment, the inverting input terminal of the operational amplifier OP1 is connected to the output end of the voltage detection circuit 4 through the input resistor R4 as mentioned above. Therefore, as the amplitude of the coil voltage Vx becomes greater and as the electric power supplied from the high-frequency power supply circuit 2 to the induction coil 5 grows higher, the output voltage of the operational amplifier OP1 is made lower. This increases the electric current (hereinafter referred to as a "sweep current") Isw flowing from the control terminal CON to the sweep circuit 31, making the operation frequency f higher. Thus the electric power supplied from the high-frequency power supply circuit 2 to the induction coil 5 becomes lower. In other words, the sweep circuit 31 also performs a feedback operation using the detection voltage Vxs outputted from the voltage detection circuit 4. In addition, the sweep circuit 31 operates as follows when the voltage of the capacitor C1 is stabilized. If the switch SW is turned on, the voltage Vc1 inputted to the non-inverting input terminal of the operational amplifier OP1 and the output voltage of the operational amplifier OP1 are lower than the voltage available when the switch SW is turned off. This results in an increase in the sweep current Isw and the operation frequency f, thereby reducing the electric power supplied from the high-frequency power supply circuit 2 to the induction coil 5. When the switch SW is turned from an on-state to an off-state, the output voltage of the operational amplifier OP1 is gradually increased according to the time constant of the circuit composed of the resistors R1 and R2 and the capacitor C1. This results in a gradual decrease in the sweep current Isw and the operation frequency f. Thus the sweep circuit 31 performs a sweep operation for gradually increasing the electric power supplied from the high-frequency power supply circuit 2 to the induction coil 5.

The control circuit 3 further includes a feedback circuit 32 for controlling the operation frequency f based on the voltage at the junction point of the lower switching element Q2 and the detection resistor Rd of the high-frequency power supply circuit 2, i.e., the electric current flowing through the high-frequency power supply circuit 2. The feedback circuit 32 includes an operational amplifier OP2 whose non-inverting input terminal is supplied with a specified reference voltage Vr1 and whose output terminal is connected to the control terminal CON of the drive unit 21 through a diode D2 and an input resistor R6. The inverting input terminal of the operational amplifier OP2 is connected to the output terminal thereof through a parallel circuit composed of a resistor R7 and a capacitor C2 and also to the junction point of the switching element Q2 and the detection resistor Rd through a resistor R8. The electric current (hereinafter referred to as a "feedback current") Ifb flowing from the control terminal CON of the drive unit 21 to the feedback circuit 32 becomes greater in proportion to the electric current flowing through the induction coil 5 (namely, the electric power supplied to the induction coil 5), which acts to reduce the electric power supplied to the induction coil 5. Thus the feedback circuit 32 is operable to keep constant the electric power supplied from the high-frequency power supply circuit 2 to the induction coil 5. The sweep circuit 31 and the feedback circuit 32 are designed to ensure that, when the switch SW of the sweep circuit 31 is turned off with the voltage of the capacitor C1 stabilized, the operation frequency f is kept equal to a lighting frequency f1 (see FIG. 5) at which the electric power enough to generate H-discharge (or arc discharge also called high-frequency electromagnetic field discharge or inductively-coupled discharge) in the induction lamp 6 is supplied from the high-frequency power supply circuit 2 to the induction coil 5, and also to ensure that, when the switch SW of the sweep circuit 31 is turned on with the voltage of the capacitor C1 stabilized, the operation frequency f is kept equal to an extinction frequency f2 at which the electric power enough to generate E-discharge (or glow discharge also called high-frequency electric field discharge or capacitatively-coupled discharge) in the induction lamp 6 is supplied from the high-frequency power supply circuit 2 to the induction coil 5. Thanks to the feedback operation of the sweep circuit 31 and the feedback circuit 32, the operation frequency f becomes lower than the frequency mentioned above if the direct current voltage Vdc is lower than the normal voltage Vs. In contrast, the operation frequency f becomes higher than the frequency mentioned above if the direct current voltage Vdc is higher than the normal voltage Vs. In other words, the target value of the electric power supplied to the induction coil 5 (namely, the target value of the amplitude of the coil voltage Vx) is set such that the H-discharge is generated in the induction lamp 6 when the switch SW of the sweep circuit 31 is turned off with the voltage of the capacitor C1 stabilized and such that the E-discharge rather than the H-discharge is generated in the induction lamp 6 when the switch SW of the sweep circuit 31 is turned on with the voltage of the capacitor C1 stabilized. In FIG. 5, the voltage Vx1 denotes the amplitude |Vx| of the coil voltage Vx at which the H-discharge (arc discharge) is generated in the induction lamp 6.

The operation of the induction lamp lighting device in accordance with the present embodiment will now be described with reference to FIG. 1. In each of the four graphs shown in FIG. 1, the horizontal axis designates the time t. The vertical axis in the uppermost graph designates the absolute value Vin of the voltage inputted from the alternating current power supply AC (namely, the output voltage of the diode bridge DB, which will be simply referred to as an "input voltage" hereinafter). The vertical axis in the second graph from the top designates the output voltage Vdc of the direct current power supply circuit 1. The vertical axis in the third graph from the top designates the operation frequency f of the high-frequency power supply circuit 2. The vertical axis in the lowermost graph designates the coil voltage Vx.

In this regard, one ends of the capacitors Cc and Ci are connected to the ground and the other ends thereof are connected to the voltage control unit 11 of the direct current power supply circuit 1 and the drive unit 21 of the high-frequency power supply circuit 2, respectively. The voltage control unit 11 and the drive unit 21 are monitoring the supply of electric power from the alternating current power supply AC and start to charge the capacitors Cc and Ci connected to themselves at the timing t0 (hereinafter referred to as an "on time point") when the supply of the electric power from the alternating current power supply AC is started. Then, the voltage control unit 11 and the drive unit 21 start to drive the switching elements Q0, Q1 and Q2 at the timing when the voltage of the capacitors Cc and Ci connected to themselves reaches a specified voltage. By the operation of the voltage control unit 11, the direct current voltage Vdc is gradually increased up to the normal voltage Vs from the timing decided on the basis of the voltage of the capacitor Cc. After reaching the normal voltage Vs, the direct current voltage Vdc is maintained at the normal voltage Vs until the timing t4 when the supply of the electric power from the alternating current power supply AC is stopped. In the example shown in FIG. 1, the timing t1 at which the drive unit 21 of the high-frequency power supply circuit 2 starts to drive the switching elements Q1 and Q2 (namely, the timing at which the supply of the alternating current power to the induction coil 5 is started, which will be referred to as a "startup time point" hereinafter) goes after the timing at which the voltage control unit 11 of the direct current power supply circuit 1 starts to drive the switching element Q0.

In the control circuit 3, the switch SW of the sweep circuit 31 is on-off controlled by a switch control unit (not shown). The switch SW is brought into an on-state at least at the startup time point t1 when the switching elements Q1 and Q2 of the high-frequency power supply circuit 2 are started to be driven. The switch SW can be turned to an off-state at the timing (hereinafter referred to as a "preparation time end point") t2 when a specified preparation time has lapsed from the startup time point t1. During the time period (hereinafter referred to as a "startup preparation period") from the startup time point t1 to the preparation time end point t2, a startup preparation operation is performed by which the target value of the electric power supplied to the induction coil 5 is kept low enough not to generate arc discharge in the induction lamp 6. The feedback control is performed by the sweep circuit 31 and the feedback circuit 32 during the startup preparation operation. As a result, the operation frequency f is made equal to the extinction frequency f2. From the preparation time end point t2, the operation frequency f is gradually decreased to the lighting frequency f1 by the sweep operation of the sweep circuit 31. At a certain time point (hereinafter referred to as a "lighting time point") t3 after the operation frequency f is made equal to the lighting frequency f1, the H-discharge (arc discharge) is started in the induction lamp 6. In response, the circuit characteristics are changed from the ones represented by the curve A in FIG. 5 to the ones designated by the curve B. Thus the amplitude of the coil voltage Vx becomes smaller. Thereafter, the switch SW of the sweep circuit 31 is kept in an off-state and the operation frequency f is maintained at the lighting frequency f1, until the induction lamp 6 is extinguished.

When the lamp 6 is extinguished, the input of the charging voltage Vd to the capacitor C1 of the sweep circuit 31 is stopped and the capacitor C1 is discharged through the resistor R2. As a consequence, the operation frequency f is made equal to a startup point frequency f3 higher than the extinction frequency f2 at the startup time point t1. Due to the charging operation of the capacitor C1 during the startup preparation period, the operation frequency f is gradually decreased to the extinction frequency f2 and then kept at the extinction frequency f2 until the preparation time end point t2.

With the configuration described above, the operation frequency f is started from the startup point frequency f3 higher than the extinction frequency f2 at the startup time. Therefore, as compared to a case where the operation frequency f is started from the extinction frequency f2, the amplitude of the coil voltage Vx is gently increased immediately after the startup time point t1. This reduces the electrical stresses developed in circuit parts.

In addition, as compared to a case where the operation frequency f is made equal to the lighting frequency f1 from the outset without performing the startup preparation operation, the characteristics of a load circuit composed of the induction coil 5 and the induction lamp 6 are gently changed at the startup time. This helps stabilize the amplitude of the coil voltage Vx and the direct current voltage Vdc.

As already set forth, the extinction frequency f2 in the present embodiment is set such that the E-discharge (glow discharge) can be generated in the induction lamp 6. Therefore, as compared to a case where the operation frequency f is made equal to the lighting frequency f1 from the outset or set lower than the extinction frequency f2, this shortens the time period during which the amplitude of the coil voltage Vx becomes relatively great, namely the time period from the time point when the operation frequency f is made equal to the lighting frequency f1 to the time point when the H-discharge (arc discharge) is actually started in the induction lamp 6. This reduces the electrical stresses developed in circuit parts at the startup time.

In addition, the feedback operation of the sweep circuit 31 and the feedback circuit 32 helps suppress the influence caused by the variations in the characteristics of circuit parts or the ambient temperature.

In case where a general commercial power supply is used as the alternating current power supply AC, there may sometimes occur what is called an instantaneous current drop by which the input voltage Vin is made equal to zero or otherwise dropped for an extremely short time as in the time period t4 to t0' shown in FIG. 1. The induction lamp 6 is extinguished by the instantaneous current drop. If the lamp lighting operation is restarted at the timing t0' when the supply of electric power from the alternating current power supply AC is normalized, the operation frequency f available immediately after the startup operation becomes lower than the frequency available at a usual startup time because the voltage of the capacitor C1 of the sweep circuit 31 is not reduced due to the short duration of the instantaneous current drop. Therefore, the amplitude of the coil voltage Vx grows relatively high, which tends to increase the electrical stresses developed in circuit parts. In the present embodiment, however, there is provided a configuration by which the operation frequency f available at the time of starting the output of alternating current power from the high-frequency power supply circuit 2 to the induction coil 5 is made lower than the one available in the prior art example. This makes it possible to suppress the electrical stresses developed in circuit parts, even after occurrence of the instantaneous current drop.

In case where the sweep circuit 31 does not employ the resistor R11 arranged between the non-inverting input terminal of the operational amplifier OP1 and the capacitor C1, the resistance value of the resistor R10 serially connected to the switch SW needs to be increased in order to keep the extinction frequency f2 as low as mentioned above and to secure the amplitude of the coil voltage Vx during the startup preparation period. In this case, the discharging operation of the capacitor C1 at the end of extinction of the lamp 6 is slowed down. In the present embodiment, however, the resistor R11 is employed in an effort to assure compatibility of the decrease in the extinction frequency f2 and the increase in the discharging speed of the capacitor C1.

Second Embodiment

Since the basic configuration of the second embodiment is common to that of the first embodiment, the common parts are designated by like reference characters and will be omitted from description.

Figure 6:
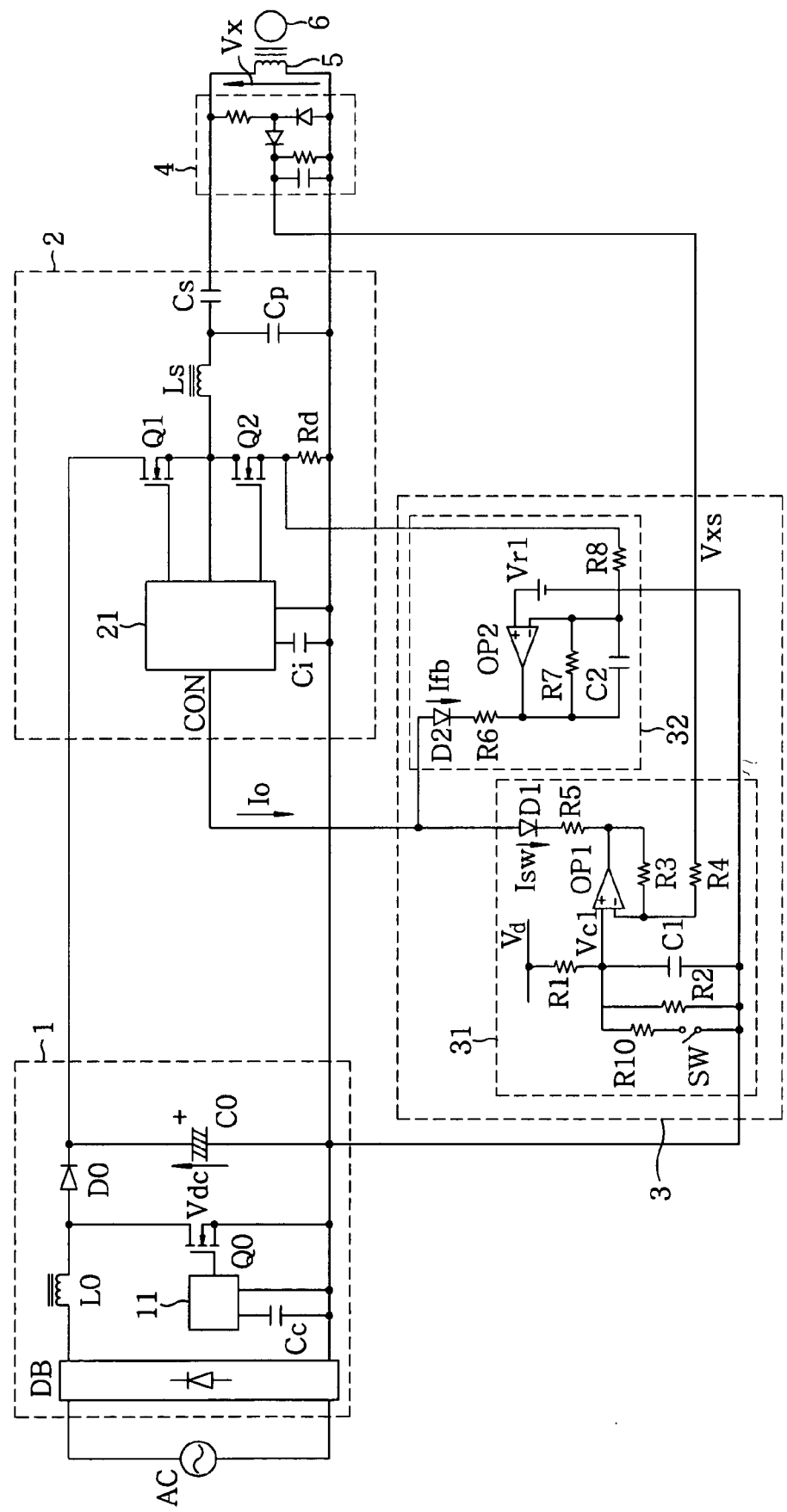
FIG. 6 is a circuit block diagram showing an induction lamp lighting device in accordance with a second embodiment of the present invention.

The present embodiment differs from the first embodiment in that, as shown in FIG. 6, the control circuit 3 does not employ the R11 which would otherwise be arranged between the non-inverting input terminal of the operational amplifier OP1 and the capacitor C1.

The operation of the induction lamp lighting device in accordance with the second embodiment will now be described with reference to FIG. 7. In each of the four graphs shown in FIG. 7, the horizontal axis designates the time t. The vertical axis in the uppermost graph designates the absolute value Vin of the voltage inputted from the alternating current power supply AC (namely, the output voltage of the diode bridge DB, which will be simply referred to as an "input voltage" hereinafter). The vertical axis in the second graph from the top designates the output voltage Vdc of the direct current power supply circuit 1. The vertical axis in the third graph from the top designates the operation frequency f of the high-frequency power supply circuit 2. The vertical axis in the lowermost graph designates the coil voltage Vx.

In this regard, one ends of the capacitors Cc and Ci are connected to the ground and the other ends thereof are connected to the voltage control unit 11 of the direct current power supply circuit 1 and the drive unit 21 of the high-frequency power supply circuit 2, respectively. The voltage control unit 11 and the drive unit 21 are monitoring the supply of electric power from the alternating current power supply AC and start to charge the capacitors Cc and Ci connected to themselves at the timing t0 (hereinafter referred to as an "on time point") when the supply of the electric power from the alternating current power supply AC is started. Then, the voltage control unit 11 and the drive unit 21 start to drive the switching elements Q0, Q1 and Q2 at the timing (hereinafter referred to as a "startup time point") t1 when the voltage of the capacitors Cc and Ci connected to themselves reaches a specified voltage. In the present embodiment, the capacitance value of the capacitors Cc and Ci and the specified voltage are decided to ensure that the operation of the switching element Q0 of the direct current power supply circuit 1 and the operation of the switching elements Q1 and Q2 of the high-frequency power supply circuit 2 are started at the same time. Under the control of the voltage control unit 11, the direct current voltage Vdc is gradually increased up to the normal voltage Vs from the startup time point t1 and then kept at the normal voltage Vs until the time point t4 when the supply of electric power to the direct current power supply circuit 1 is stopped.

In the control circuit 3, the switch SW of the sweep circuit 31 is on-off controlled by a switch control unit (not shown). The switch SW is brought into an on-state at least at the startup time point t1 when the switching elements Q1 and Q2 of the high-frequency power supply circuit 2 are started to be driven. The switch SW can be turned to an off-state at the timing (hereinafter referred to as a "preparation time end point") t2 when a specified preparation time has lapsed from the startup time point t1. During the time period (hereinafter referred to as a "startup preparation period") from the startup time point t1 to the preparation time end point t2, a startup preparation operation is performed by which the operation frequency f is kept at the extinction frequency f2. The feedback control is performed by the sweep circuit 31 and the feedback circuit 32 during the startup preparation operation.

From the preparation time end point t2, the operation frequency f is gradually decreased to the lighting frequency f1 by the sweep operation of the sweep circuit 31. At a certain time point (hereinafter referred to as a "lighting time point") t3 after the operation frequency f is made equal to the lighting frequency f1, the H-discharge (arc discharge) is started in the induction lamp 6. In response, the circuit characteristics are changed from the ones represented by the curve A in FIG. 5 to the ones designated by the curve B. Thus the amplitude of the coil voltage Vx becomes smaller. Thereafter, the switch SW of the sweep circuit 31 is kept in an off-state and the operation frequency f is maintained at the lighting frequency f1, until the induction lamp 6 is extinguished.

With the configuration described above, the timing at which to start the output of alternating current power from the high-frequency power supply circuit 2 to the induction coil 5 is the same as the timing at which to start the operation of boosting the direct current voltage Vdc in the direct current power supply circuit 1, namely the startup time point t1 when the direct current voltage Vdc has not yet reached the normal voltage Vs. Therefore, as compared to a case where the output of alternating current power is started after the direct current voltage Vdc has reached the normal voltage Vs, the amplitude of the coil voltage Vx is gently increased immediately after the startup time point t1. This helps reduce the electrical stresses developed in circuit parts. In addition, as compared to a case where the output of alternating current power is started after the direct current voltage Vdc has reached the normal voltage Vs, the output of alternating current power to the induction coil 5 is instantaneously started. This helps shorten the time required in lighting the induction lamp 6. In order to obtain the advantageous effects noted above, the timing at which to start the output of alternating current power from the high-frequency power supply circuit 2 to the induction coil 5 may precede the timing at which the direct current voltage Vdc reaches the normal voltage Vs or may come before or after the timing at which the operation of boosting the direct current voltage Vdc in the direct current power supply circuit 1 is started (namely, the timing at which the switching element Q0 begins to be driven by the voltage control unit 11). However, electric power loss would be increased if the timing at which to start the output of alternating current power comes before the timing at which the operation of boosting the direct current voltage Vdc is started. In contrast, the electrical stresses developed in circuit parts would be increased if the timing at which to start the output of alternating current power comes after the timing at which the operation of boosting the direct current voltage Vdc is started. For these reasons, it is preferred that the timing at which to start the output of alternating current power coincides with the timing at which the operation of boosting the direct current voltage Vdc is started.

Moreover, as compared to a case where the operation frequency f is made equal to the lighting frequency f1 from the outset without performing the startup preparation operation, the characteristics of a load circuit composed of the induction coil 5 and the induction lamp 6 are gently changed at the startup time. This helps stabilize the amplitude of the coil voltage Vx and the direct current voltage Vdc, thereby suppressing the premature extinction or flickering of the induction lamp 6 which would be caused by the transient reduction in the electric power outputted to the induction coil 5.

As already set forth, the extinction frequency f2 in the present embodiment is set such that the E-discharge (glow discharge) can be generated in the induction lamp 6. Therefore, as compared to a case where the operation frequency f is made equal to the lighting frequency f1 from the outset or set lower than the extinction frequency f2, this shortens the time period during which the amplitude of the coil voltage Vx becomes relatively great, namely the time period from the time point when the operation frequency f is made equal to the lighting frequency f1 to the time point when the H-discharge (arc discharge) is actually started in the induction lamp 6. This reduces the electrical stresses developed in circuit parts at the startup time.

In addition, the feedback control of the sweep circuit 31 and the feedback circuit 32 is performed during the startup preparation operation, which helps suppress the influence caused by the variations in the characteristics of circuit parts or the ambient temperature. Therefore, as compared to a case where the feedback control is not performed, the amplitude of the coil voltage Vx is stabilized during the startup preparation operation.

Figure 7:
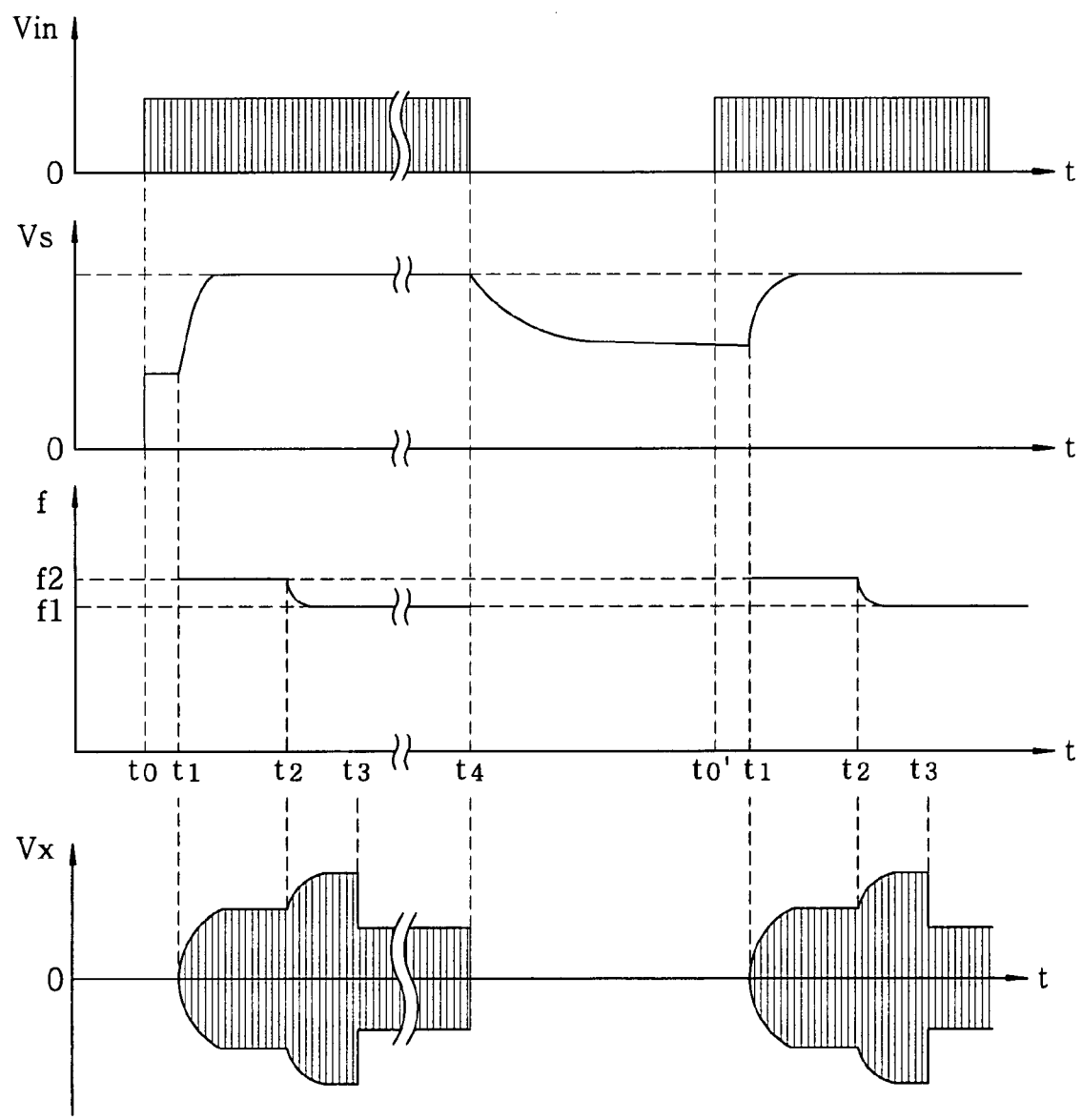
FIG. 7 is an explanatory view illustrating the operation of the lighting device of the second embodiment.

In case where a general commercial power supply is used as the alternating current power supply AC, there may sometimes occur what is called an instantaneous current drop by which the input voltage Vin is made equal to zero or otherwise dropped for an extremely short time as in the time period t4 to t0' shown in FIG. 7. In case where the alternating current power supply AC and a battery (not shown) are interchangeably used as a power supply of the direct current power supply circuit 1, it is presumed that the supply of electric power to the direct current power supply circuit 1 is once stopped during the power supply switching time. The induction lamp 6 is extinguished by the instantaneous current drop or the power supply stoppage. If the lamp lighting operation is restarted at the timing t0' when the supply of electric power to the direct current power supply circuit 1 is normalized, the operation frequency f available immediately after the startup operation becomes lower than the extinction frequency f2 because the voltage of the capacitor C1 of the sweep circuit 31 is not completely reduced due to the short duration of the instantaneous current drop or the power supply stoppage. Therefore, the amplitude of the coil voltage Vx grows relatively high, which tends to increase the electrical stresses developed in circuit parts. In the present embodiment, however, the timing at which to start the output of alternating current power from the high-frequency power supply circuit 2 to the induction coil 5 precedes the timing at which the direct current voltage Vdc reaches the normal voltage Vs. Thanks to this feature, it is possible to suppress the electrical stresses developed in circuit parts, even after occurrence of the instantaneous current drop or the power supply stoppage.

In addition, the electric power of an output capacitor C0 of the direct current power supply circuit 1 may be consumed by operating the high-frequency power supply circuit 2 even after the supply of electric power from the alternating current power supply AC is stopped. Use of this configuration is preferable in that, as compared to a case where the direct current voltage Vdc is reduced only by the natural discharging operation of the output capacitor C0, it is possible to lower the direct current voltage Vdc at the end time point t0' of the instantaneous current drop and to keep the electrical stresses as low as possible.

Third Embodiment

Since the basic configuration of the third embodiment is common to that of the first embodiment, the common parts are designated by like reference characters and will be omitted from description.

Figure 8:
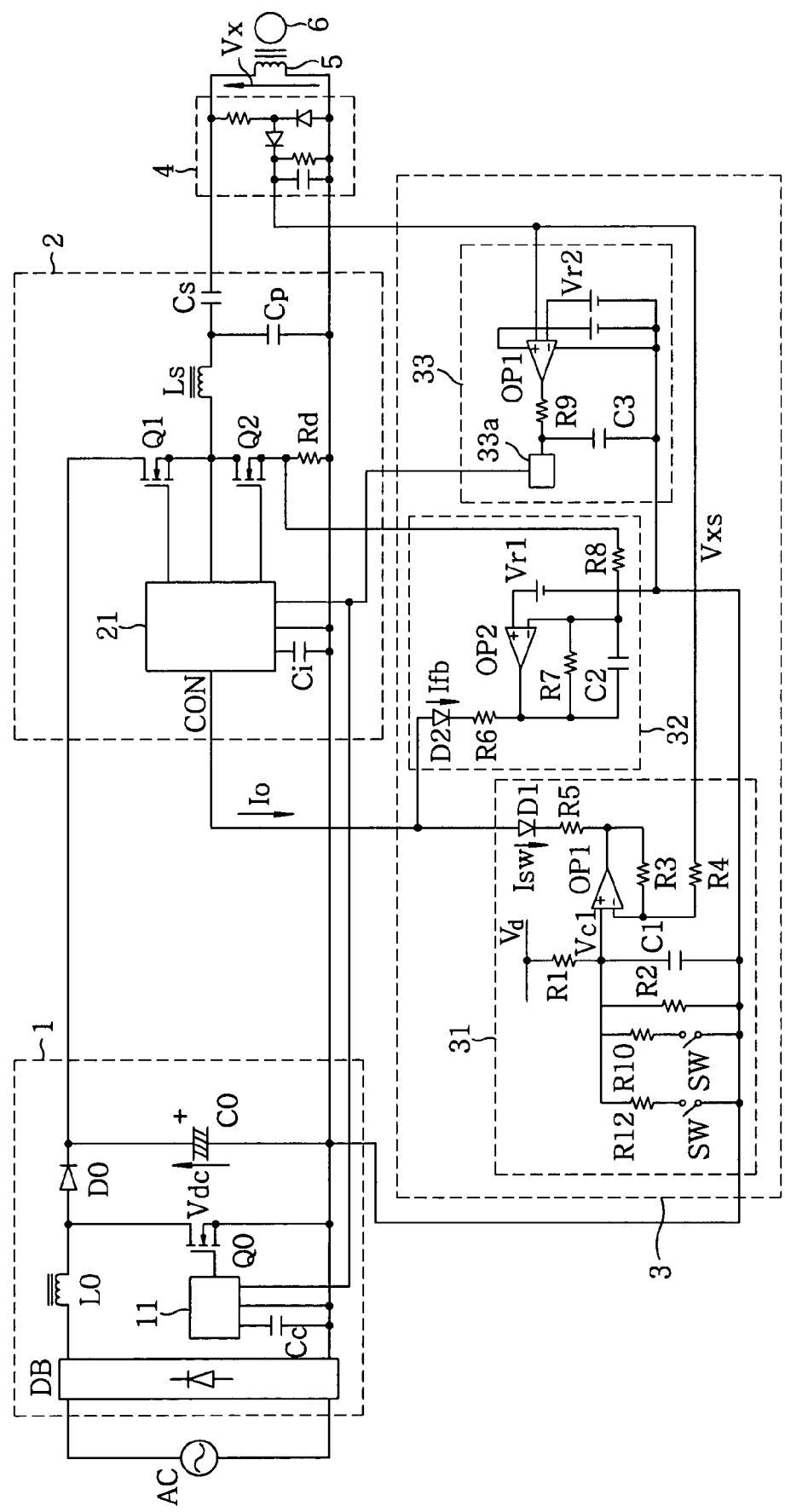
FIG. 8 is a circuit block diagram showing an induction lamp lighting device in accordance with a third embodiment of the present invention.

The present embodiment differs from the first embodiment in that, as shown in FIG. 8, the control circuit 3 includes a protection circuit 33 that performs a specified protection operation by detecting the non-lighting of the induction lamp 6 based on the detection voltage Vxs outputted from the voltage detection circuit 4. Another difference resides in the configuration of the sweep circuit 31.

Figure 9:
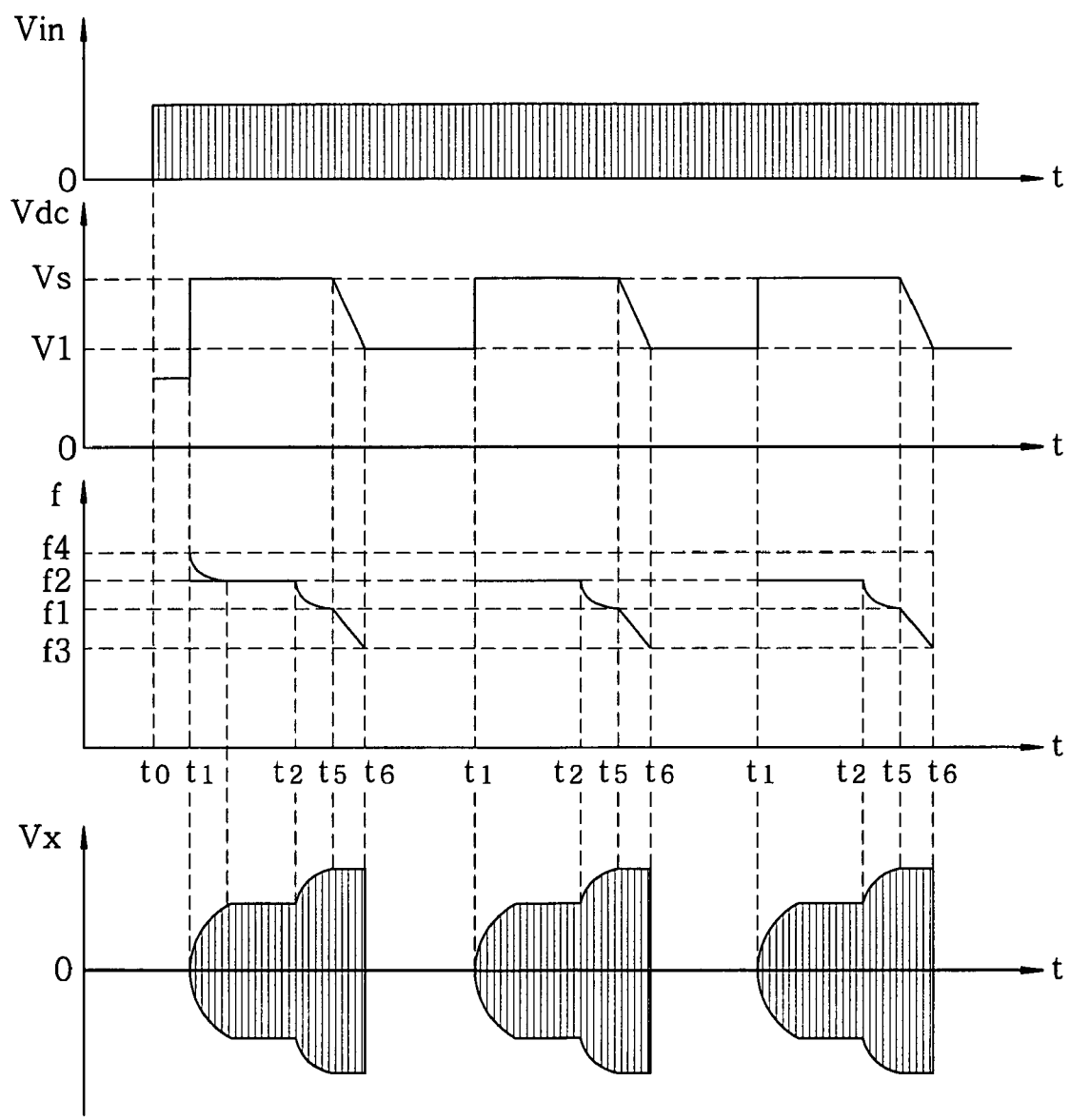
FIG. 9 is an explanatory view illustrating the operation of the lighting device of the third embodiment.

Description is first made on the sweep circuit 31. The sweep circuit 31 of the present embodiment differs from that of the first embodiment in that the resistor R11 is not arranged between the non-inverting input terminal of the operational amplifier OP1 and the capacitor C1 and in that a series circuit composed of a switch SW1 and a resistor R12 is added and connected in parallel to the capacitor C1. The sweep circuit 31 further includes a switch control unit (not shown) for on-off controlling the switches SW and SW1. During the time period from the extinction time of the induction lamp 6 to the startup time point t1, the switch control unit turns on the switches SW and SW1 of the sweep circuit 31, thereby making the operation frequency f at the startup time point t1 equal to the startup frequency f4 which is higher than the extinction frequency f2 as illustrated in FIG. 9. At the startup time point t1, the switch control unit turns off the switch SW1 so that the operation frequency f can be gradually decreased to the extinction frequency f2 according to the time constant of the capacitor C1 and the resistors R2 and R10. At the preparation time end point t2, the switch control unit turns off the switch SW so that the operation frequency f can be gradually decreased to the lighting frequency f1 according to the time constant of the capacitor C1 and the resistor R2. The switch control unit mentioned above can be realized by the well-known technology and therefore will be omitted from illustration and description.

Figure 10:
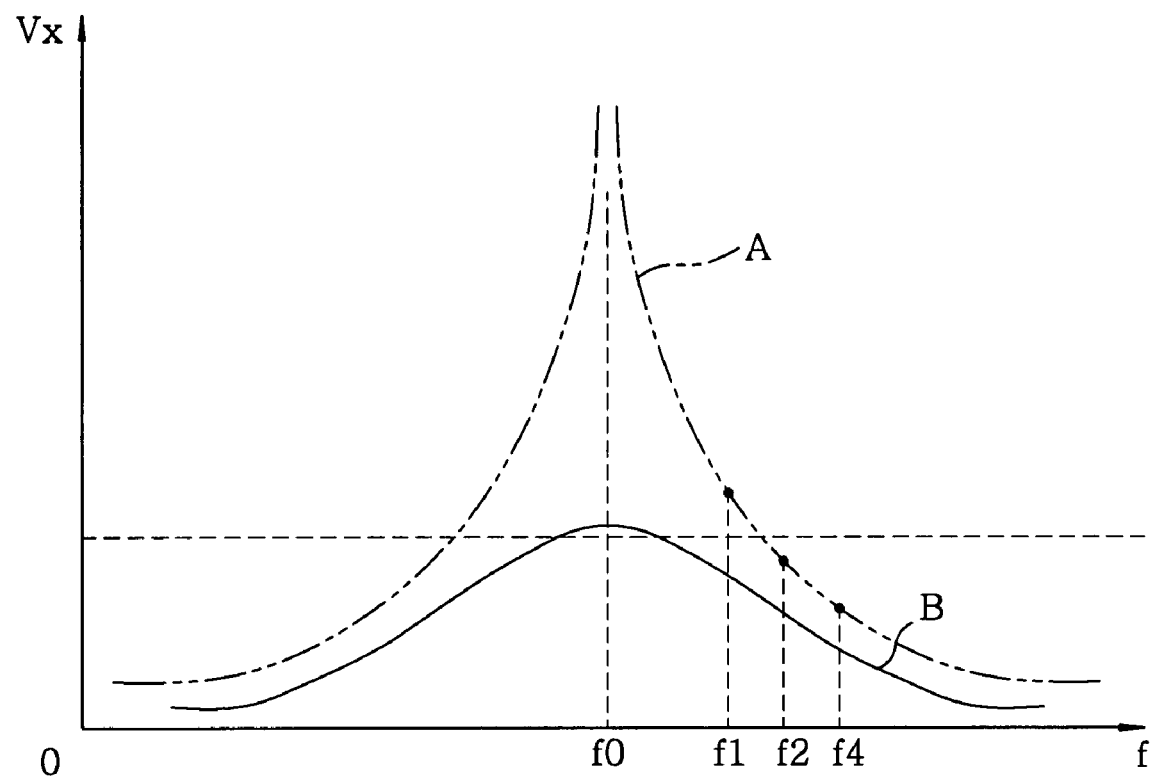
FIG. 10 is an explanatory view illustrating the relationship between an operation frequency and a coil voltage in the lighting device of the third embodiment.

In FIG. 10, the upper curve A represents the relationship between the amplitude |Vx| of the coil voltage Vx and the operation frequency f when the direct current voltage Vdc is kept at the normal voltage Vs with the induction lamp 6 extinguished. The lower curve B represents the relationship between the amplitude |Vx| of the coil voltage Vx and the operation frequency f when the direct current voltage Vdc is kept at the normal voltage Vs with the induction lamp 6 lighted.

As shown in FIG. 8, the control circuit 3 of the present embodiment includes the protection circuit 33 for detecting an abnormality (the non-lighting of the induction lamp 6) based on the detection voltage Vxs outputted from the voltage detection circuit 4. The protection circuit 33 includes a comparator CP1 whose non-inverting input terminal is connected to the output end of the voltage detection circuit 4 and whose inverting input terminal is supplied with the reference voltage Vr2. The protection circuit 33 further includes a capacitor C3 charged by the output voltage of the comparator CP1 inputted through a resistor R9, and a protection control unit 33a for detecting an abnormality based on the voltage of the capacitor C3 and for stopping the voltage control unit 11 of the direct current power supply circuit 1 and the drive unit 21 of the high-frequency power supply circuit 2 when the abnormality is detected.

More specifically, the protection control unit 33a is monitoring the voltage of the capacitor C3 and starts a protection operation if the voltage of the capacitor C3 is higher than a specified determination voltage. As illustrated in FIG. 9, the protection operation is performed by alternately repeating three times: the protection period t6 to t1 during which the drive unit 21 of the high-frequency power supply circuit 2 is stopped to cease the output of electric power from the circuit 2 to the induction coil 5; and the startup period t1 to t6 during which the high-frequency power supply circuit 2 is controlled so that the electric power great enough to generate arc discharge (H-discharge) in the induction lamp 6 can be outputted to the induction coil 5 after the startup preparation operation t1 to t2.

In each of the four graphs shown in FIG. 9, the horizontal axis designates the time t. The vertical axis in the uppermost graph designates the absolute value Vin of the voltage inputted from the alternating current power supply AC (namely, the output voltage of the diode bridge DB). The vertical axis in the second graph from the top designates the output voltage Vdc of the direct current power supply circuit 1. The vertical axis in the third graph from the top designates the operation frequency f of the high-frequency power supply circuit 2. The vertical axis in the lowermost graph designates the coil voltage Vx.

Immediately before the end of the startup period t1 to t6 (in the present embodiment, at the time point at which the operation frequency f has reached the lighting frequency f1 by the sweep operation, which time point will be referred to as a "determination point" hereinafter), abnormality determination is made based on the voltage of the capacitor C3. If no abnormality is detected as a result of the voltage of the capacitor C3 being lower than the determination voltage, the protection control unit 33a determines that the induction lamp 6 was lighted successfully. Subsequently, the control circuit 3 performs a normal operation during which the lighting (arc discharge) state of the induction lamp 6 is maintained by keeping the amplitude of the coil voltage Vx constant. In contrast, if the protection operation is continuously performed as a result of the abnormality being detected at the determination point t5, the protection control unit 33a stops the voltage boosting operation performed by the voltage control unit 11 of the direct current power supply circuit 1 (namely, the operation of the switching element Q0) for a specified time t5 to t1, whereby the direct current voltage Vdc is made equal to a protection voltage V1 lower than the normal voltage Vs during the protection period. At the beginning t1 of the startup period, the protection control unit 33a restarts the operation of the voltage control unit 11, thereby gradually increasing the direct current voltage Vdc up to the normal voltage Vs once again. During the respective startup periods, therefore, the output of electric power from the high-frequency power supply circuit 2 to the induction coil 5 is started before the direct current voltage Vdc reaches the normal voltage Vs, as is the case in the usual startup operation.

In the present embodiment, the timing t6 at which the drive unit 21 of the high-frequency power supply circuit 2 is stopped comes after the timing t5 at which the voltage control unit 11 of the direct current power supply circuit 1 is stopped. At the stoppage time t6 of the high-frequency power supply circuit 2, therefore, the operation frequency f is decreased to a frequency f3, which is closer to the resonance frequency f0 than to the lighting frequency f1, by the feedback operation of the sweep circuit 31 and the feedback circuit 32 that tends to compensate the decrease in the direct current voltage Vdc. At the beginning of the protection period (namely, at the stoppage time of the drive unit 21 of the high-frequency power supply circuit 2), the switch SW of the sweep circuit 31 are turned on as is the case at the usual extinction time. The switch SW is kept in an on-state until is it turned off at the preparation end time point t2 at which a specified preparation time has lapsed from the beginning t1 of the next startup period. As a result, the same startup preparation operation as at the usual startup time is performed at the beginning of the respective startup periods.

If the induction lamp 6 is not lighted and the abnormality continues to be detected even after the termination of the protection operation, the protection control unit 33a of the protection circuit 33 determines that there has occurred a load-free state in which the induction lamp 6 is not arranged adjacent to the induction coil 5. Thus the protection control unit 33a protects the circuit by stopping the voltage control unit 11 and the drive unit 21 and then keeping them inoperative.

With the configuration described above, the startup performance is improved by the protection operation as compared to the first embodiment.

During the protection period and at least immediately before the startup period, the direct current voltage Vdc is kept equal to the protection voltage V1 lower than the normal voltage Vs. Therefore, the electrical stresses developed in circuit parts at the beginning t1 of the respective startup periods are reduced as compared to a case where the direct current voltage Vdc is maintained constant during the protection operation.

Since the timing t6 at which the drive unit 21 of the high-frequency power supply circuit 2 is stopped comes after the timing t5 at which the voltage control unit 11 of the direct current power supply circuit 1 is stopped, the electric power of the output capacitor C0 of the direct current power supply circuit 1 is consumed by the high-frequency power supply circuit 2 during the time period t5 to t6 between the stoppage of the voltage control unit 11 and the subsequent stoppage of the drive unit 21. For that reason, the direct current voltage Vdc is rapidly reduced as compared to a case where the voltage control unit 11 and the drive unit 21 are stopped at the same time and the direct current voltage Vdc is reduced only by the natural discharging operation of the output capacitor C0. This makes it possible to shorten the time required in the protection operation while keeping the electrical stresses developed in circuit parts as it is or to suppress the electrical stresses developed at the time of restarting the protection operation while keeping the time required in the protection operation as it is.

During the protection period, the drive unit 21 of the high-frequency power supply circuit 2 may not be stopped as noted above but may be continuously operated at the operation frequency f so that the amplitude of the coil voltage Vx can become smaller than the maximum value available in the startup preparation operation (namely, the amplitude at the preparation period end point t2). Use of this configuration helps lessen the fluctuation in the amplitude of the coil voltage Vx at the startup time point t1 after termination of the protection operation, which further reduces the electrical stresses developed in circuit parts.

Fourth Embodiment

Figure 12:
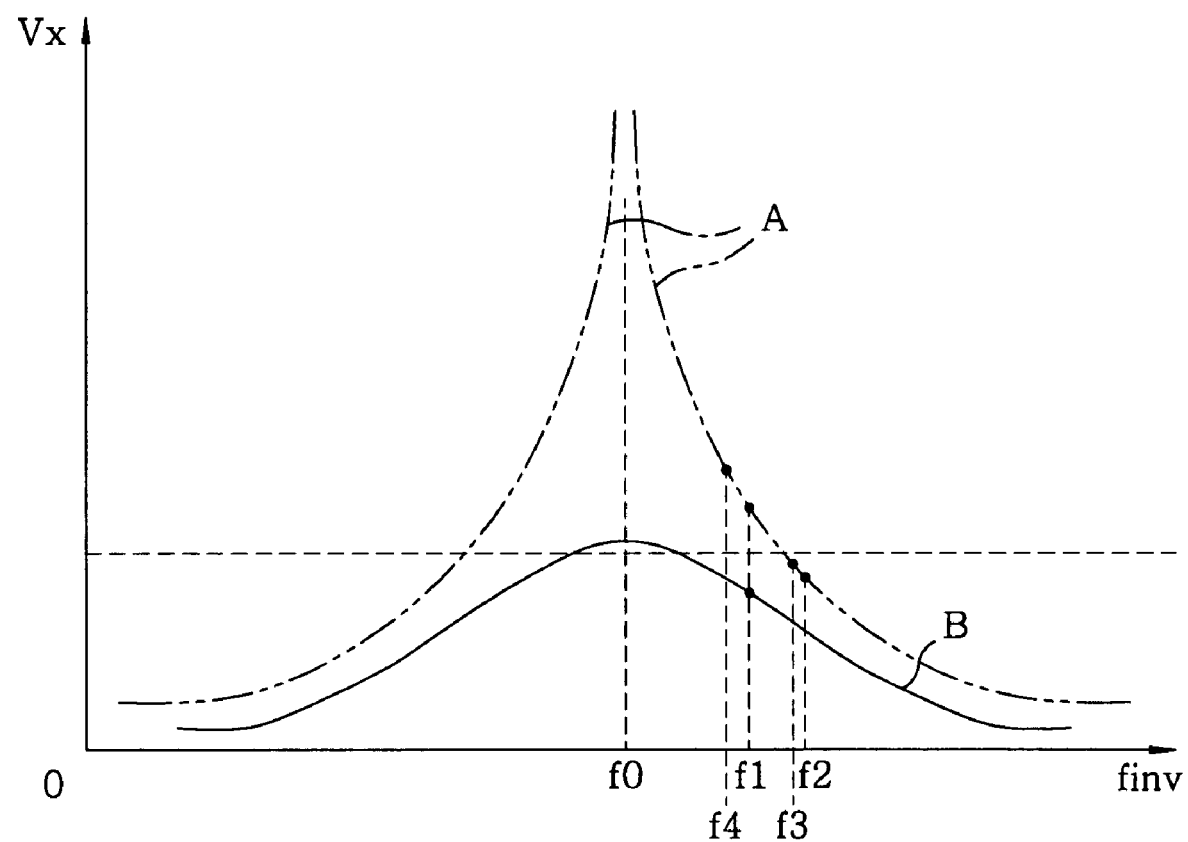
FIG. 12 is an explanatory view illustrating the relationship between an operation frequency and a coil voltage in the lighting device of the fourth embodiment.
Figure 13:
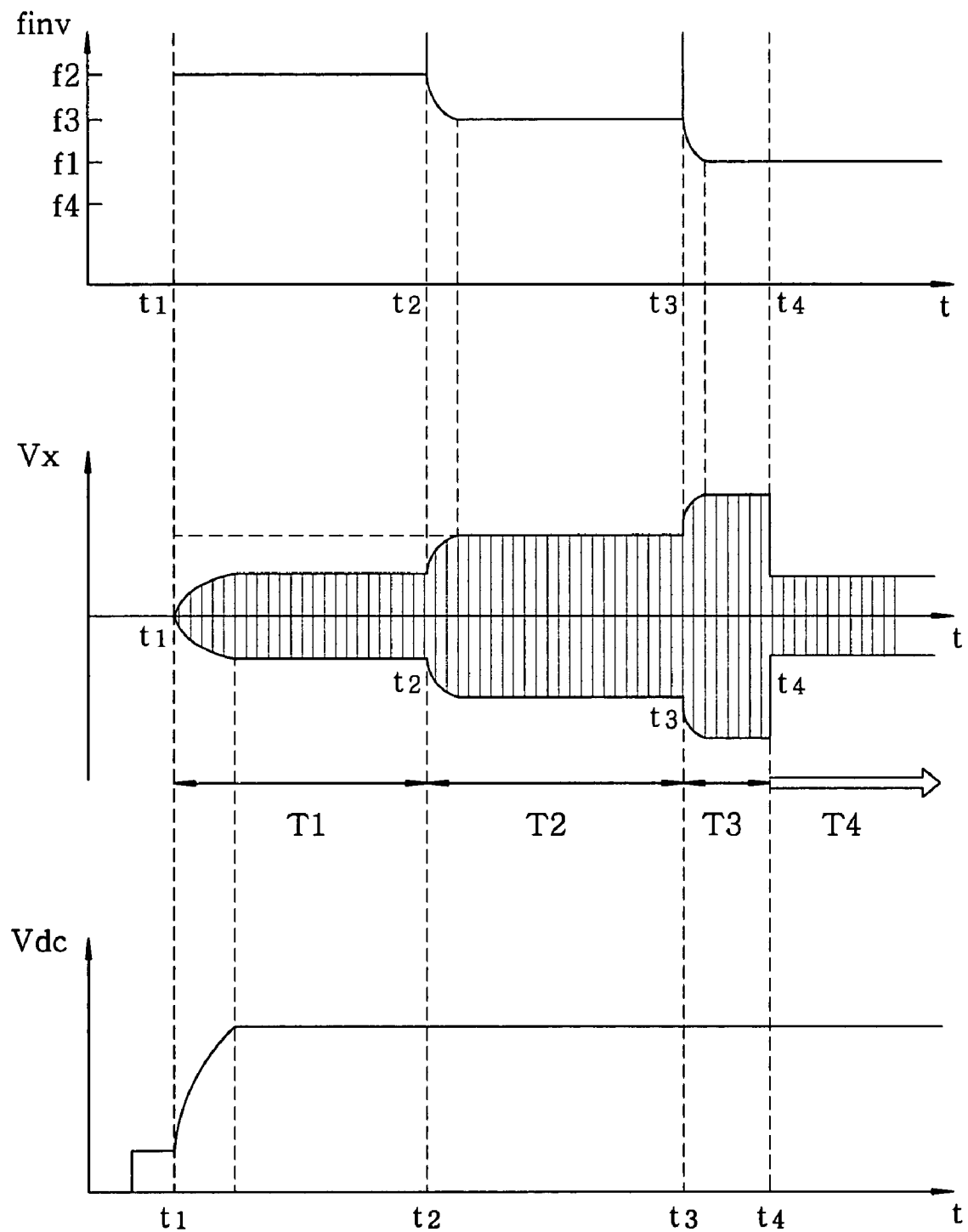
FIG. 13 is an explanatory view illustrating the operation of the lighting device of the fourth embodiment.

An induction lamp lighting device in accordance with the fourth embodiment of the present invention will now be described with reference to FIGS. 11 through 13.

Figure 11:
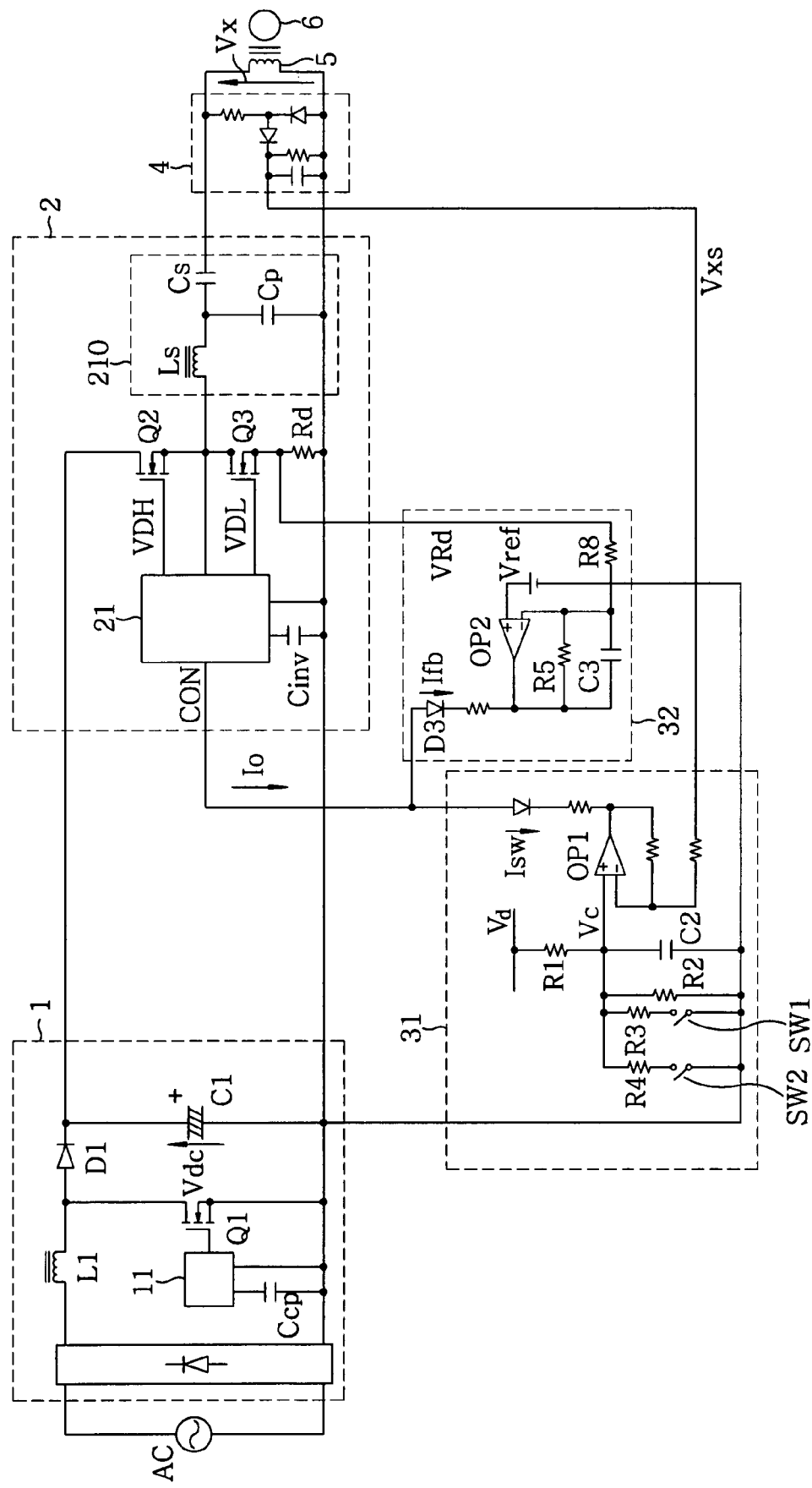
FIG. 11 is circuit block diagram showing an induction lamp lighting device in accordance with a fourth embodiment of the present invention.

Referring to FIG. 11, the lighting device of the present embodiment includes a direct current power supply circuit 1 for producing desired direct current output power from the alternating current output power of the alternating current power supply AC, a high-frequency power supply circuit 2 for converting the direct current output power of the direct current power supply circuit 1 to high-frequency output power and supplying the same to the induction coil 5 arranged near the induction lamp 6, a sweep circuit 31 for starting up the induction lamp 6 by gradually increasing the output voltage Vx of the high-frequency power supply circuit 2 (the voltage applied to the induction coil 5) at the lamp startup time, a voltage detection circuit 4 for detecting the output voltage Vx of the high-frequency power supply circuit 2, a current detection circuit for detecting a resonance current flowing through the below-mentioned resonance circuit 210, and a feedback circuit 32 for changing the frequency (operation frequency) finv of drive signals VDH and VDL by controlling the below-mentioned drive unit 21 based on the detection current of the current detection circuit so that output voltage Vx of the high-frequency power supply circuit 2 can be equal to a desired level.

The direct current power supply circuit 1 is formed of a conventional well-known boost chopper circuit that includes a rectifier circuit 10 for rectifying the alternating current outputted from a commercial power supply AC and a drive unit 11 for driving an inductor L1, a diode D1, a smoothening capacitor C1 and a switching element Q1. The direct current power supply circuit 1 is designed to output a direct current voltage Vdc.

The high-frequency power supply circuit 2 includes a pair of switching elements Q2 and Q3 serially connected between the output ends of the direct current power supply circuit 1 and is formed of a so-called half-bridge type inverter circuit in which a resonance circuit 210 including an inductor Ls and capacitors Cp and Cs is connected to the lower switching element Q3. Responsive to the drive signals VDH and VDL as rectangular wave pulses outputted from the drive unit 21, the switching elements Q2 and Q3 composed of field effect transistors are alternately switched by the high-frequency power supply circuit 2 so that the high-frequency output power can be supplied to the induction coil 5 through the resonance circuit 210. The drive signal VDH for driving the switching element Q2 and the drive signal VDL for driving the switching element Q3 have a phase difference of about 180 degrees.

Capacitors Ccp and Cinv are interposed between the drive units 11 and 21 and the ground. The capacitors Ccp and Cinv are used in setting the time period between the time when the supply of an electric current from the commercial power supply AC is started and the time when the drive units 11 and 21 come into operation.

The induction coil 5 composed of multiple turns of conductive wire is connected to the output end of the resonance circuit 210. The induction lamp 6 is arranged adjacent to the induction coil 5.

The voltage detection circuit 4 includes a current-rectifying diode, a voltage-dividing resistor, a smoothening capacitor and so forth. Outputted from the voltage detection circuit 4 to the sweep circuit 31 is a detection voltage Vxs, i.e., a direct current voltage corresponding to the output voltage Vx of the high-frequency power supply circuit 2. The current detection circuit is formed of a detection resistor Rd connected between the lower switching element Q3 of the high-frequency power supply circuit 2 and the ground. Outputted from the current detection circuit to the feedback circuit 32 is a detection voltage VRd corresponding to the high-frequency current flowing through the switching element Q3 (namely, the resonance current flowing through the resonance circuit 210).

The sweep circuit 31 includes a capacitor C2 charged through a temperature-sensitive resistor R1 by the operation voltage Vd resulting from reduction and stabilization of the output voltage Vdc of the direct current power supply circuit 1, an error amplifier formed by connecting an input resistor and a feedback resistor to an operational amplifier OP1 and designed to amplify the difference between the voltage Vc of the capacitor C2 and the detection voltage Vxs of the voltage detection circuit 4, a voltage-dividing resistor R2 connected in parallel to the capacitor C2, a series circuit of a resistor R3 and a discharging switch SW1, both of which are connected in parallel to the capacitor C2, and a series circuit of a resistor R4 and a discharging switch SW2, both of which are connected in parallel to the capacitor C2. The sweep circuit 31 produces an output voltage Vf which is gradually increased according to the time constant of a charging circuit composed of the resistor R1 and the capacitor C2. The output voltage Vf of the sweep circuit 31 is inputted to the drive unit 21. In the present embodiment, the on/off switching operations of the switches SW1 and SW2 are controlled by a switch control circuit (not shown) composed of, e.g., a microcomputer. The switch control circuit is preliminarily set so as to periodically switch the on/off states of the switches SW1 and SW2 after the lighting device is started up.

The feedback circuit 32 includes an error amplifier (or a differential amplifier) formed by connecting an input resistor and the like to an operational amplifier OP2 and designed to amplify the difference between a reference voltage Vref and the detection voltage VRd of the current detection circuit, and a diode D3 whose cathode is connected to the output terminal of the operational amplifier OP2 through a resistor. The reference voltage Vref is inputted to the non-inverting input terminal of the operational amplifier OP2. A delay circuit formed of a parallel circuit of a resistor R5 and a capacitor C3 is connected between the inverting input terminal and the output terminal of the operational amplifier OP2. In addition, the cathode of a diode D2 is connected through a resistor to the output terminal of the operational amplifier OP1 that forms the error amplifier of the sweep circuit 31. The anodes of the diodes D2 and D3 are connected in parallel to the input terminal of the drive unit 21. In this connection, a constant voltage (or an input terminal voltage) is applied to the input terminal of the drive unit 21. When the output voltage of the error amplifier of the sweep circuit 31 (namely, the output voltage Vf of the operational amplifier OP1) is smaller than the input terminal voltage of the drive unit 21, the diode D2 is conducted so that a first control current Isw corresponding to the electric potential difference can flow therethrough. Likewise, when the output voltage of the error amplifier of the feedback circuit 32 (namely, the output voltage Vn of the operational amplifier OP2) is smaller than the input terminal voltage of the drive unit 21, the diode D3 is conducted so that a second control current Ifb corresponding to the electric potential difference can flow therethrough. This means that the magnitude of the control current Io flowing out from the input terminal of the drive unit 21 is equal to the total sum of the first and second control currents Isw and Ifb.

In the meantime, the drive unit 21 is provided with an oscillator. The oscillation frequency of the oscillator is changed depending on the control current Io flowing from the input terminal of the drive unit 21 to the output terminals of the sweep circuit 31 and the feedback circuit 32. The frequency (operation frequency) finv of the drive signals VDH and VDL is increased or decreased in proportion to the control current Io. Therefore, the operation frequency finv of the drive unit 21 is proportionally reduced as the output voltages Vf and Vn of the error amplifiers of the sweep circuit 31 and the feedback circuit 32 grow higher.

The operation of the lighting device in accordance with the present embodiment will now be described with reference to FIGS. 12 and 13. FIG. 12 illustrates the output characteristics of the high-frequency power supply circuit 2, in which view the horizontal axis designates the operation frequency finv of the drive unit 21 and the vertical axis designates the output voltage Vx of the high-frequency power supply circuit 2. The curve A represents the extinction state of the induction lamp 6 (namely, the load-free state), while the curve B represents the lighting state of the induction lamp 6 (namely, the lighting time). FIG. 13 shows a time chart in which each of the horizontal axes designates the time t and the vertical axes designate the operation frequency finv of the drive unit 21, the output voltage Vx of the high-frequency power supply circuit 2 and the output voltage Vdc of the direct current power supply circuit 1, respectively, from the top of the time chart.

If an electric current begins to be supplied from the commercial power supply AC to the direct current power supply circuit 1 with the switches SW1 and SW2 turned on (at the time point t1), the output voltage Vdc of the direct current power supply circuit 1 is increased and the output voltage Vf of the sweep circuit 31 is made equal to a voltage value corresponding to the quotient of the operation voltage Vd divided by the resistors R1, R2, R3 and R4. At this time, the frequency finv of the drive signals VDH and VDL outputted from the drive unit 21 (namely, the operation frequency of the high-frequency power supply circuit 2) is set equal to the initial voltage value (or the startup initiation frequency) f2 (see FIG. 13). As illustrated in FIG. 12, the startup initiation frequency f2 is set equal to a frequency sufficiently higher than the resonance frequency f0 available in the load-free state. Therefore, the output voltage Vx of the high-frequency power supply circuit 2 at the operation frequency finv (=f2) can be reduced to a low value (see FIG. 13). The time period during which the switches SW1 and SW2 are all turned on lasts until the time point t2, which time period is called a first startup preparation period T1.

The first startup preparation period T1 is started until the output voltage Vdc of the direct current power supply circuit 1 reaches a specified voltage (namely, a stable voltage available at the lighting time of the induction lamp 6). In the first startup preparation period T1, the induction coil 5 is supplied with the high-frequency voltage Vx great enough to apply load to the direct current power supply circuit 1 so that the output voltage Vdc of the direct current power supply circuit 1 does not exceed a specified voltage.

At the time point t2, the switch SW2 is turned off and the output voltage Vf is made equal to a voltage value corresponding to the quotient of the operation voltage Vd divided by the resistors R1, R2 and R3. At this time, the output voltage Vf becomes greater than that available in the first startup preparation period T1. For that reason, as the output voltage Vf is increased as illustrated in FIG. 12, the operation frequency finv is made equal to a frequency f3 smaller than the startup initiation frequency f2. The output voltage Vx of the high-frequency power supply circuit 2 becomes greater than the output voltage Vx available in the first startup preparation period T1 and is kept as high as possible within the extent of not starting up the induction lamp 6 (see FIG. 13). The time period during which the switch SW2 is turned off with the switch SW1 turned on lasts until the time point t3, which time period is called a second startup preparation period T2.

At the time point t3, the switch SW1 as well as the switch SW2 is turned off and the output voltage Vf is made equal to a voltage value corresponding to the quotient of the operation voltage Vd divided by the resistors R1 and R2. At this time, the output voltage Vf becomes greater than that available in the second startup preparation period T2. For that reason, as the output voltage Vf is increased as illustrated in FIG. 12, the operation frequency finv is made equal to a frequency f1 smaller than the frequency f3. The output voltage Vx of the high-frequency power supply circuit 2 becomes greater than the output voltage Vx available in the second startup preparation period T2 (see FIG. 13). A startup period T3 comes after the time point t3. In the startup period T3, the output voltage Vx of the high-frequency power supply circuit 2 reaches a startup voltage. At the time point t4, the induction lamp 6 is lighted up and the characteristics are changed from the curve A to the curve B. As a result, the output voltage Vx is decreased and a lighting period T4 comes (see FIG. 13).

Turning to the feedback circuit 32, the output current (resonance current) of the high-frequency power supply circuit 2 is nearly zero at the time point t1. Therefore, the detection voltage VRd becomes nearly zero and the output voltage Vn of the operational amplifier OP2 forming the error amplifier of the feedback circuit 32 is made equal to the initial value (maximum value) corresponding to the reference voltage Vref. As time goes by, the output current of the high-frequency power supply circuit 2 is increased together with the detection voltage VRd. Due to the operation of the delay circuit composed of the resistor R5 and the capacitor C3, the output voltage Vn of the operational amplifier OP2 does not drop from the initial value, and the second control current Ifb of the feedback circuit 32 becomes nearly zero. Therefore, while the output voltage Vn of the operational amplifier OP2 is kept higher than the input terminal voltage of the drive unit 21, the second control current Ifb becomes nearly zero and the control current Io is nearly equal to the first control current Isw. For that reason, the feedback circuit 32 does not perform the feedback control of the operation frequency finv but performs only the control by which the operation frequency finv is gradually reduced according to the first control current Isw outputted from the sweep circuit 31.

In this regard, the time delayed by the delay circuit of the feedback circuit 32 is set substantially equal to the time required in initially lighting the induction lamp 6 (the time lapsed from the time point t1 to the time point t3). After the time point t3, the second control current Ifb flows according to the electric potential difference between the output voltage Vn of the operational amplifier OP2 and the input terminal voltage of the drive unit 21. Therefore, the operation frequency finv is increased together with the increase in the control current Io, and the output voltage Vx of the high-frequency power supply circuit 2 is decreased. The operation frequency finv of the drive unit 21 is stabilized at the frequency (rated lighting frequency) available when the resonance current is equal to a desired level for rated lighting of the induction lamp 6, namely when the detection voltage VRd is equal to the reference voltage Vref. Since then, the feedback circuit 32 feedback controls the operation frequency finv of the drive unit 21 so that the resonance current (namely, the output current of the high-frequency power supply circuit 2) can be equal to the desired level determined by the reference voltage Vref, thereby stably lighting the induction lamp 6.

As set forth above, the second startup preparation period T2, in which the output voltage Vx of the high-frequency power supply circuit 2 is set as great as possible within the extent of not starting up the induction lamp 6, is provided before the startup period T3. This makes it possible to prevent steep load fluctuation which would otherwise occur during transition to the startup period T3. It is also possible to secure a great enough startup voltage by preventing reduction of the output voltage Vdc of the direct current power supply circuit 1 at the startup time. In addition, there is provided the first startup preparation period T1 which is started until the output voltage Vdc of the direct current power supply circuit 1 reaches a specified voltage and in which the induction coil 5 is supplied with the high-frequency voltage Vx great enough to apply load to the direct current power supply circuit 1 so that the output voltage Vdc of the direct current power supply circuit 1 does not exceed a specified voltage. Provision of the first startup preparation period T1 makes it possible to prevent the output voltage Vdc of the direct current power supply circuit 1 from overshooting and to prevent stresses from being applied to circuit parts.

Supposing that no voltage is applied to the induction coil 5 until the time point t2 after the electric current begins to be supplied from the commercial power supply AC to the direct current power supply circuit 1, namely supposing that only the second startup preparation period T2 is provided without the first startup preparation period T1, the voltage applied to the induction coil 5 would become nearly zero in the period between the time point t1 and the time point t2. This leads to light load under which the output voltage Vdc of the direct current power supply circuit 1 is not consumed. For this reason, the output voltage Vdc of the direct current power supply circuit 1 would overshoot beyond the specified value available at the time of lighting the induction lamp 6, eventually applying severe stresses to circuit parts. In the present embodiment, however, there is provided the first startup preparation period T1 as stated above. This makes it possible to prevent the output voltage Vdc of the direct current power supply circuit 1 from overshooting during the period between the time when the voltage begins to be supplied to the direct current power supply circuit 1 and the time when the second startup preparation period T2 is started. This eliminates the possibility that stresses are applied to circuit parts.

In the present embodiment, even when the feedback circuit 32 or the like is not reset at the restarting time after the commercial power supply AC suffers from the instantaneous current drop, the high-frequency voltage Vx applied to the induction coil 5 is increased stepwise from a low voltage over the first startup preparation period T1 and the second startup preparation period T2. This makes it possible to prevent generation of sparks at the restarting time after the instantaneous current drop.

During the transition time from the first startup preparation period T1 to the second startup preparation period T2 and during the transition time from the second startup preparation period T2 to the startup period T3, the capacitor C2 is charged and the output voltage Vf is gradually increased. This results in a gradual decrease in the operation frequency finv and a gentle increase in the output voltage Vx of the high-frequency power supply circuit 2. Thanks to this feature, it is possible to prevent the output voltage Vx of the high-frequency power supply circuit 2 from overshooting, which would otherwise be caused by steep load fluctuation at the transition time. This makes it possible to reduce the stresses applied to circuit parts.

Fifth Embodiment

Figure 14:
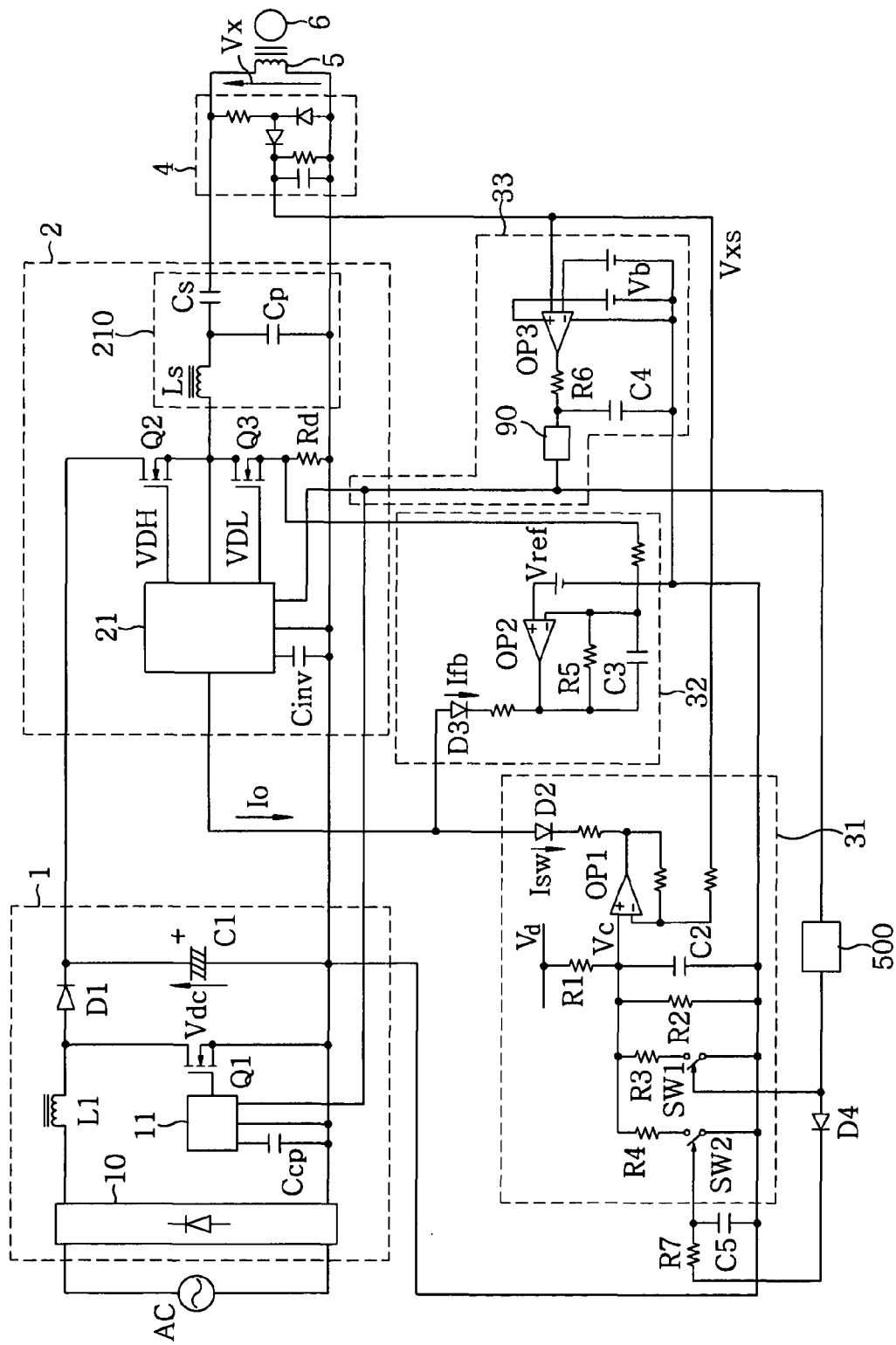
FIG. 14 is a circuit block diagram showing an induction lamp lighting device in accordance with a fifth embodiment of the present invention.
Figure 15:
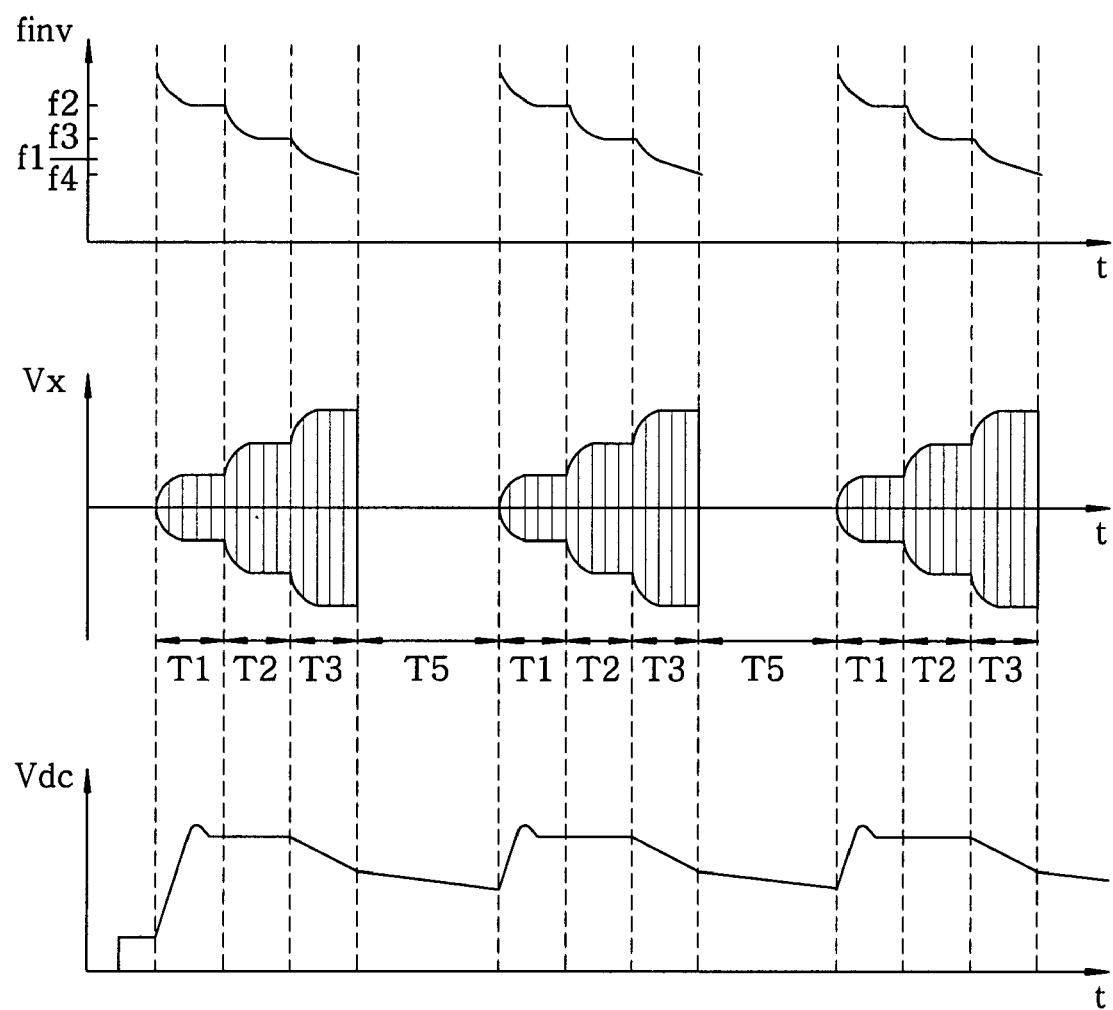
FIG. 15 is an explanatory view illustrating the operation of the lighting device of the fifth embodiment.

An induction lamp lighting device in accordance with the fifth embodiment of the present invention will now be described with reference to FIGS. 14 and 15. Since the basic configuration of the present embodiment is common to that of the fourth embodiment, the common parts are designated by like reference characters and will be omitted from description. As shown in FIG. 14, the present embodiment is characterized by the provision of a protection circuit 33 that detects an abnormality in the supply of electric power from the high-frequency power supply circuit 2 to the induction coil 5 and, upon detection of an abnormality, consecutively repeats the first startup preparation period T1, the second startup preparation period T2, the startup period T3 and a protection period T5 during which to stop the operations of the direct current power supply circuit 1 and the high-frequency power supply circuit 2.

In the present embodiment, the switching operations of the switches SW1 and SW2 in the sweep circuit 31 are performed through the use of a startup timing control circuit 500. The startup timing control circuit 500 is connected to both the drive unit 11 of the direct current power supply circuit 1 and the drive unit 21 of the high-frequency power supply circuit 2. The startup timing control circuit 500 supplies the switches SW1 and SW2 with a control signal by which the switches SW1 and SW2 is switched to an off-state after a specified time period from the time when an electric current is supplied to the drive units 11 and 21. The control signal is directly applied to the switch SW1 but indirectly applied to the switch SW2 through a delay circuit composed of a diode D4, a resistor R7 and a capacitor C5. Therefore, the switches SW1 and SW2 are controlled in such a way that the switch SW2 can be turned off after a specified time has lapsed from the time the switch SW1 is turned off. The first startup preparation period T1, the second startup preparation period T2 and the startup period T3 can be set by suitably setting the time constants of the resistor R7 and the capacitor C5.

The protection circuit 33 includes an operational amplifier OP3 whose non-inverting input terminal is supplied with the detection voltage Vxs of the voltage detection circuit 4 and whose inverting input terminal is supplied with a reference voltage Vb, a delay circuit composed of a resistor R6 and a capacitor C4, both of which are connected to the output terminal of the operational amplifier OP3, and a stop circuit 90 supplied with the voltage of the capacitor C4 for stopping the operations of the direct current power supply circuit 1 and the high-frequency power supply circuit 2 depending on the voltage thus supplied. The reference voltage Vb is set according to the high-frequency voltage Vx available in the startup period T3 so that the output voltage of the operational amplifier OP3 can be brought into a high level upon transition to the startup period T3. If the voltage of the capacitor C4 inputted to the stop circuit 90 exceeds a specified voltage, the stop circuit 90 applies a control signal to the drive unit 11 of the direct current power supply circuit 1 and the drive unit 21 of the high-frequency power supply circuit 2, thereby stopping the operations of the respective drive units for a predetermined time period. The control signal is also applied to the startup timing control circuit 500, at which time the startup timing control circuit 500 is reset.

The operation of the lighting device in accordance with the present embodiment will now be described with reference to FIG. 15. If an electric current begins to be supplied from the commercial power supply AC to the direct current power supply circuit 1, a control operation is performed to start up the induction lamp 6 through the first startup preparation period T1, the second startup preparation period T2 and the startup period T3 as in the first embodiment. In the present embodiment, feedback control is performed by applying the detection voltage Vxs of the voltage detection circuit 4 to the sweep circuit 31. Therefore, even when the output voltage Vdc of the direct current power supply circuit 1 is decreased in the startup period T3, the high-frequency voltage Vx can be prevented from dropping and kept constant by reducing the operation frequency finv from f1 to f4 (see FIGS. 2 and 5).

In case where there exists an abnormality such as a load-free state resulting from non-attachment of the induction lamp 6, a high voltage continues to be applied without lighting the induction lamp 6, which adversely affects the circuits. For that reason, it is desirable to stop the operations of the direct current power supply circuit 1 and the high-frequency power supply circuit 2 if the startup period T3 lasts for more than a predetermined time. In the present embodiment, the capacitor C4 of the protection circuit 33 begins to be charged upon transition to the startup period T3. If the voltage of the capacitor C4 exceeds a specified voltage for a predetermined time period, the stop circuit 90 applies a control signal to the respective drive units 11 and 21 and the startup timing control circuit 500, thereby stopping the operations of the direct current power supply circuit 1 and the high-frequency power supply circuit 2 for transition to the protection period T5. If a predetermined time period set by the stop circuit 90 lapses after transition to the protection period T5, the operations of the direct current power supply circuit 1 and the high-frequency power supply circuit 2 are resumed. Thereafter, the operations noted above are repeated. In this regard, the output voltage Vdc is decreased because the operation of the direct current power supply circuit 1 is stopped during the protection period T5. In the present embodiment, the first startup preparation period T1 is resumed twice until the output voltage Vdc is increased up to at least the specified voltage. If the afore-mentioned serial operations are repeated three times, it is determined by the function of the stop circuit 90 that a load-free state exists. Thus the operations of the direct current power supply circuit 1 and the high-frequency power supply circuit 2 are completely stopped to protect the circuits.

As set forth above, the lighting device of the present embodiment is provided with the stop circuit 90 for detecting an abnormality in the supply of electric power from the high-frequency power supply circuit 2 to the induction coil 5, stopping the operations of the direct current power supply circuit 1 and the high-frequency power supply circuit 2 upon detection of the abnormality and subsequently repeating once again the first startup preparation period T1, the second startup preparation period T2 and the startup period T3. Provision of the stop circuit 90 makes it possible to prevent a high voltage from being applied to the induction coil 5 for a prolonged time period without lighting the induction lamp 6 under a situation of hardly lighting the induction lamp 6 as in the dark place or at a low temperature. This makes it possible to prevent stresses from being applied to circuit parts. Since the first startup preparation period T1 is resumed twice at the restarting time until the output voltage Vdc of the direct current power supply circuit 1 is increased up to at least the specified voltage, it is possible to prevent the output voltage Vdc from increasing to a high level and to prevent stresses from being applied to circuit parts.

Sixth Embodiment

Figure 16:
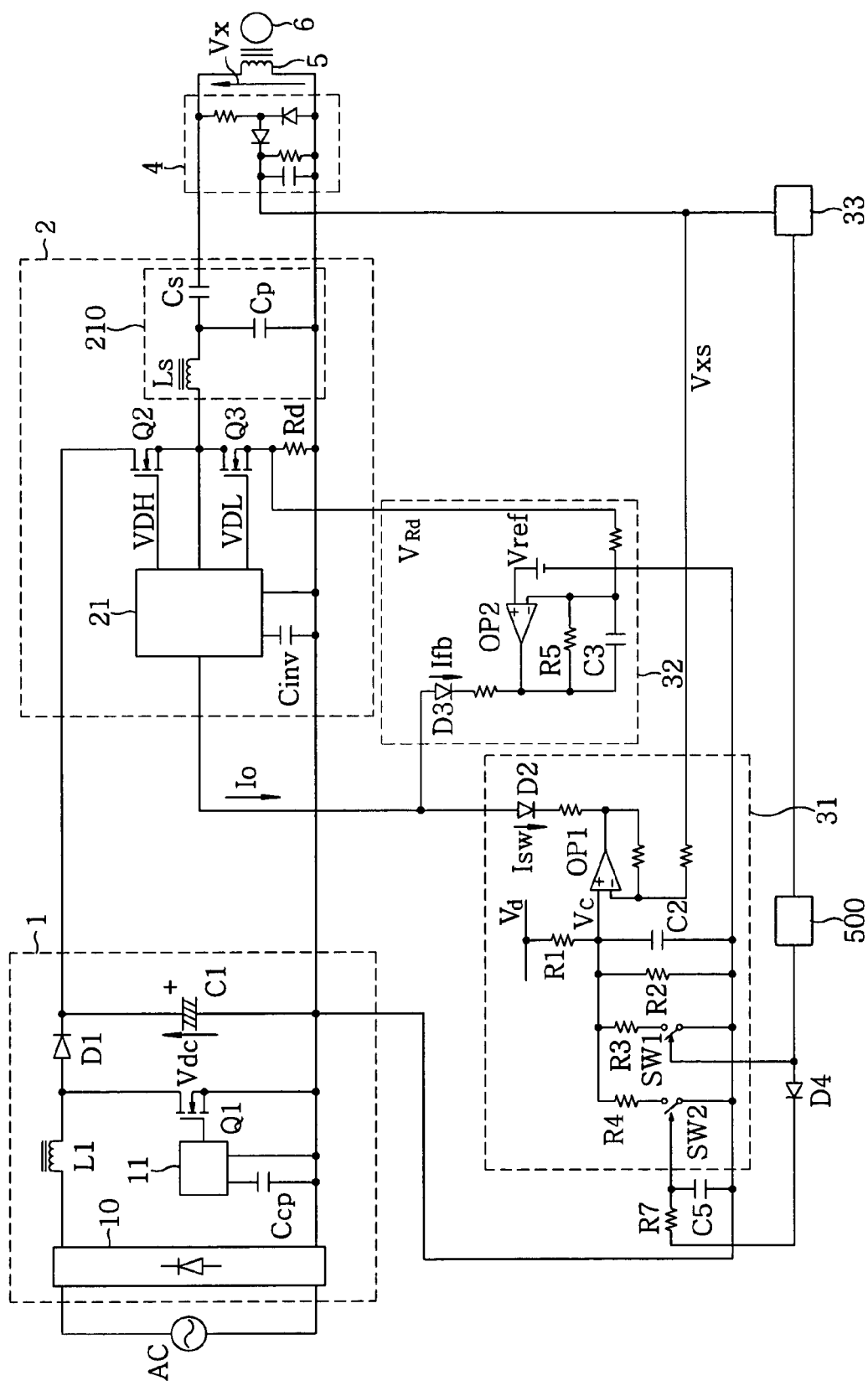
FIG. 16 is a circuit block diagram showing an induction lamp lighting device in accordance with a sixth embodiment of the present invention.
Figure 17:
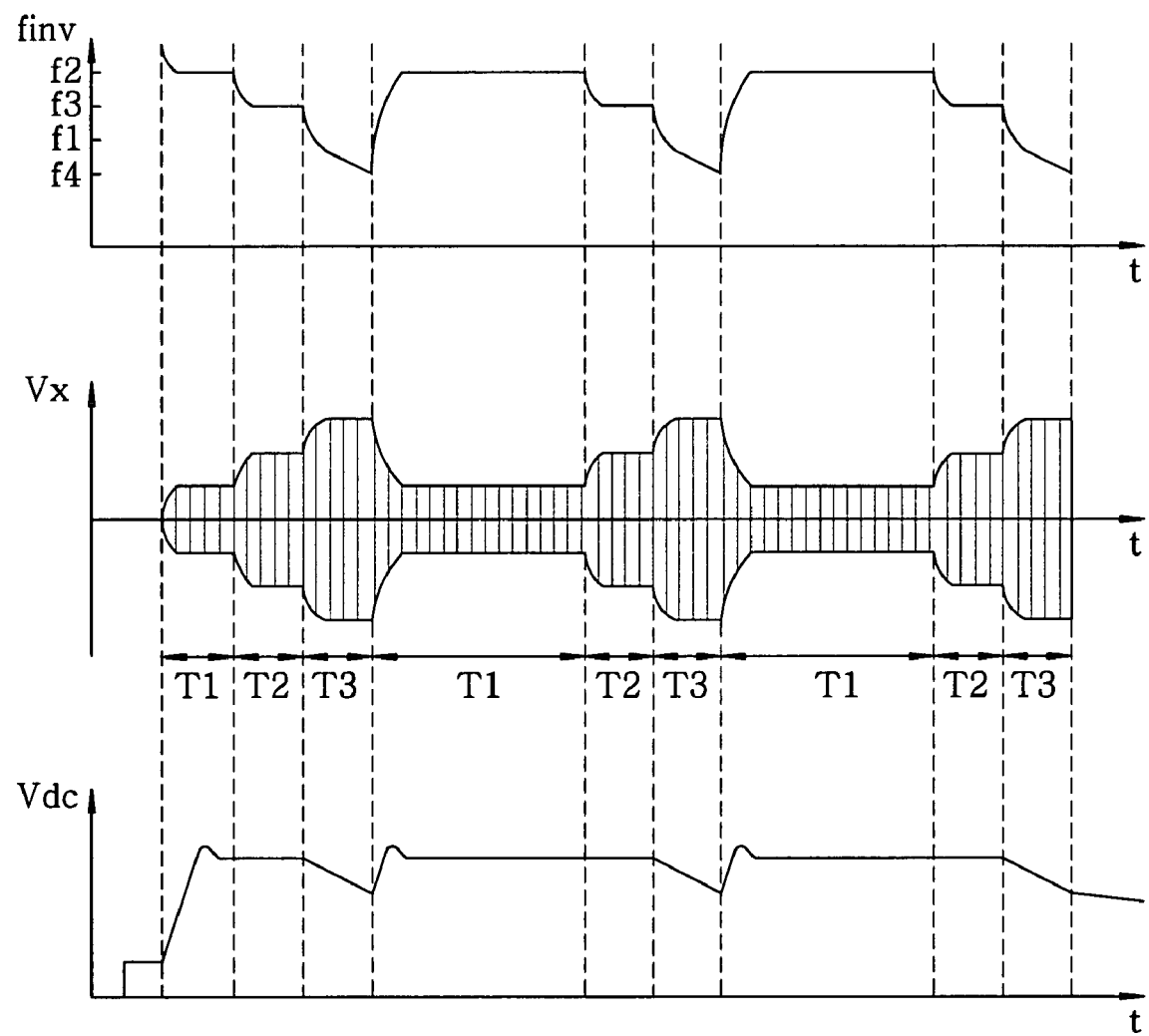
FIG. 17 is an explanatory view illustrating the operation of the lighting device of the sixth embodiment.

An induction lamp lighting device in accordance with the sixth embodiment of the present invention will now be described with reference to FIGS. 16 and 17. Since the basic configuration of the present embodiment is common to that of the fifth embodiment, the common parts are designated by like reference characters and will be omitted from description. As can be seen in FIG. 16, the lighting device of the present embodiment is characterized by applying a control signal from the protection circuit 33 to only the startup timing control circuit 500. The protection circuit 33 may have the same configuration as in the fifth embodiment or may have other configurations insofar as it can perform the same functions as those of the protection circuit 33 employed in the fifth embodiment.

The operation of the lighting device in accordance with the present embodiment will now be described with reference to FIG. 17. If an electric current begins to be supplied from the commercial power supply AC to the direct current power supply circuit 1, the same control operation as in the fifth embodiment is performed to start up the induction lamp 6 through the first startup preparation period T1, the second startup preparation period T2 and the startup period T3. The protection circuit 33 acts as in the fifth embodiment if a specified time has lapsed in the startup period T3 without lighting the induction lamp 6. Inasmuch as the control signal of the protection circuit 33 is applied to only the startup timing control circuit 500 in the present embodiment, the operations of the direct current power supply circuit 1 and the high-frequency power supply circuit 2 are not stopped. Thus the startup period T3 proceeds to the first startup preparation period T1 without going through the protection period T5. If the afore-mentioned serial operations are repeated three times, it is determined by the function of the stop circuit 90 that a load-free state exists. As a result, the operations of the direct current power supply circuit 1 and the high-frequency power supply circuit 2 are completely stopped to protect the circuits.

As mentioned above, the startup period T3 proceeds to the first startup preparation period T1 without going through the protection period T5. This eliminates the possibility that the high-frequency power supply circuit 2 is intermittently operated as is the case in the second embodiment. Therefore, it is possible to reduce the noises which would otherwise be generated by an intermittent operation.

Unlike typical electrode-type discharge lamps, the bulb 61 and the induction coil 5 need to be considered as a single unit when starting up the induction lamp 6. The induction lamp 6 is discharged in the following two modes. If a high-frequency voltage is applied to the induction coil 5, the gas present in the bulb 61 is excited through the induction coil 5 and the tubular wall of the induction lamp 6, thereby generating high-frequency electric field discharge (hereinafter referred to as "E-discharge") as pilot discharge. This gives rise to a glow discharge state. Thereafter, if a high-frequency voltage of higher level is applied to the induction coil 5, high-frequency electromagnetic field discharge (hereinafter referred to as "H-discharge") is generated to light up the induction lamp 6. This gives rise to a stable arc discharge state.

The E-discharge will be described first. By the E-discharge, it is meant that a discharge current flows through the electrostatic capacity of the tubular wall of the induction lamp 6. If a high-frequency voltage is applied to the induction coil 5, the gas present in the bulb 61 is excited through the electrostatic capacity of the induction coil 5 and the tubular wall of the induction lamp 6, thereby emitting light. This discharge serves as minor discharge (or glow discharge). Transition to major discharge occurs as the high-frequency voltage applied to the induction coil 5 is increased.

Next, description will be made on the H-discharge. By the H-discharge, it is meant that an induction current is caused to flow by electromagnetic induction of the induction coil 5. This may be regarded as a transformer in which the induction coil 5 acts as a primary coil of multiples turns and the plasma ring generated within the bulb 61 acts as a secondary coil of one turn. In this regard, the H-discharge serves as major discharge (or arc discharge) contributing to light emission in the induction lamp 6.

In the respective embodiments described above, the E-discharge is generated by applying a high-frequency voltage of such a level as to generate the E-discharge but not to generate the H-discharge in the induction coil 5 during the second startup preparation period T2. The H-discharge is generated and the induction lamp 6 is lighted up by applying a high-frequency voltage of such a level as to generate the H-discharge in the induction coil 5 during the startup period T3. This makes it possible to generate the E-discharge in the second startup preparation period T2 even if there are some variations in the ambient situation, such as a dark place or a low temperature. In addition, the transition to the startup period T3 occurs after the E-discharge is generated. This makes it possible to immediately generate the H-discharge and to shorten the startup period T3 during which a high voltage is applied to the induction coil 5. Therefore, as compared to a case where the induction lamp 6 is started up with no provision of the startup preparation period, it becomes possible to enhance the startup performance of the induction lamp 6 and to reduce the stresses applied to circuit parts.

Since the basic configuration of the seventh embodiment is common to that of the fourth embodiment, the common parts are designated by like reference characters and will be omitted from description.

Figure 18:
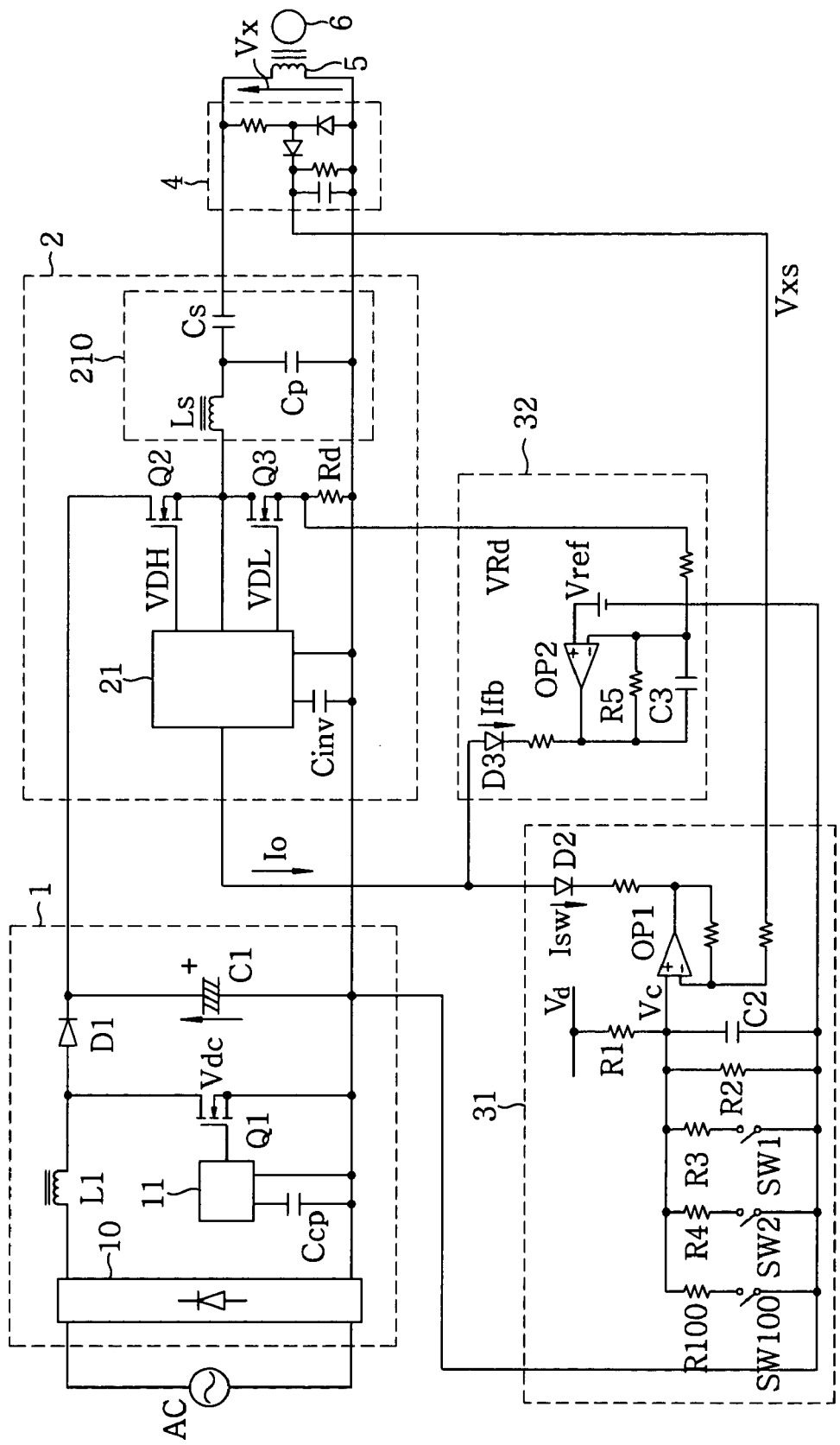
FIG. 18 is a circuit block diagram showing an induction lamp lighting device in accordance with a seventh embodiment of the present invention.

The present embodiment differs from the fourth embodiment in the configuration of the sweep circuit 31 of the control circuit 3, as can be seen in FIG. 18.

The sweep circuit 31 of the present embodiment differs from that of the fourth embodiment in that a switch SW100 and a resistor R100 are added thereto and are connected the capacitor C2 in parallel. The sweep circuit 31 is further provided with a switch control unit (not shown) for on-off controlling the switches SW, SW1 and SW2.

Figure 19:
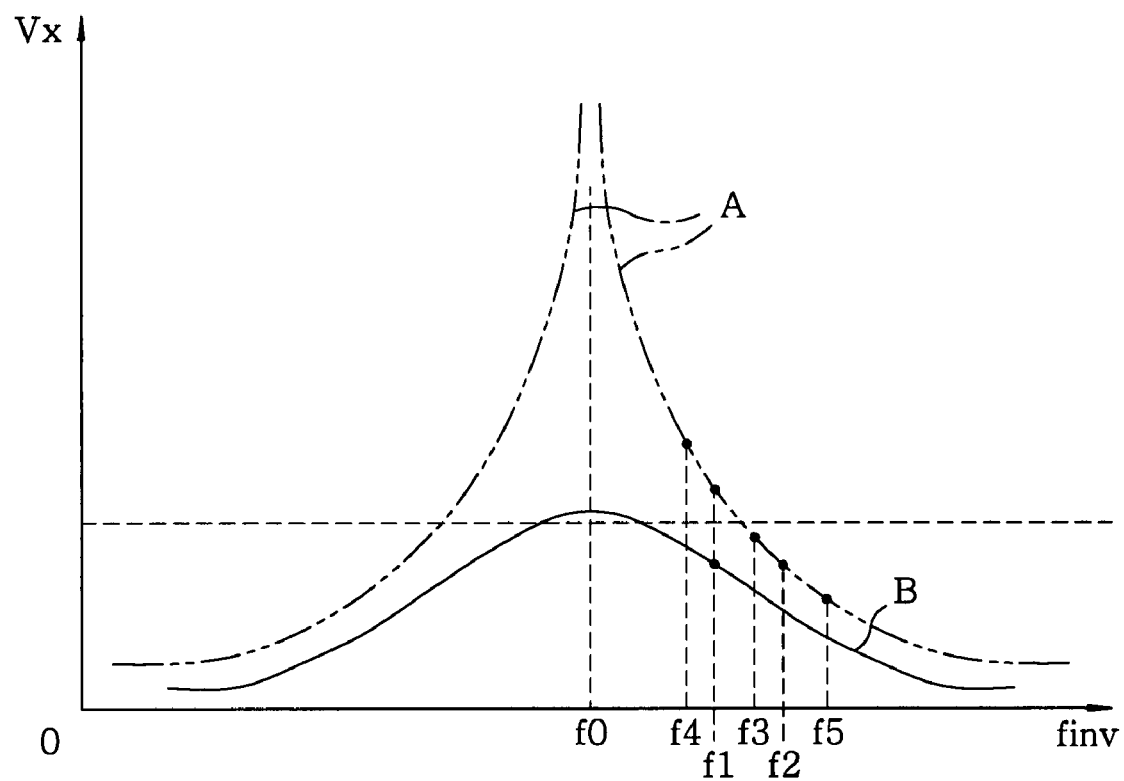
FIG. 19 is an explanatory view illustrating the relationship between an operation frequency and a coil voltage in the lighting device of the seventh embodiment.
Figure 20:
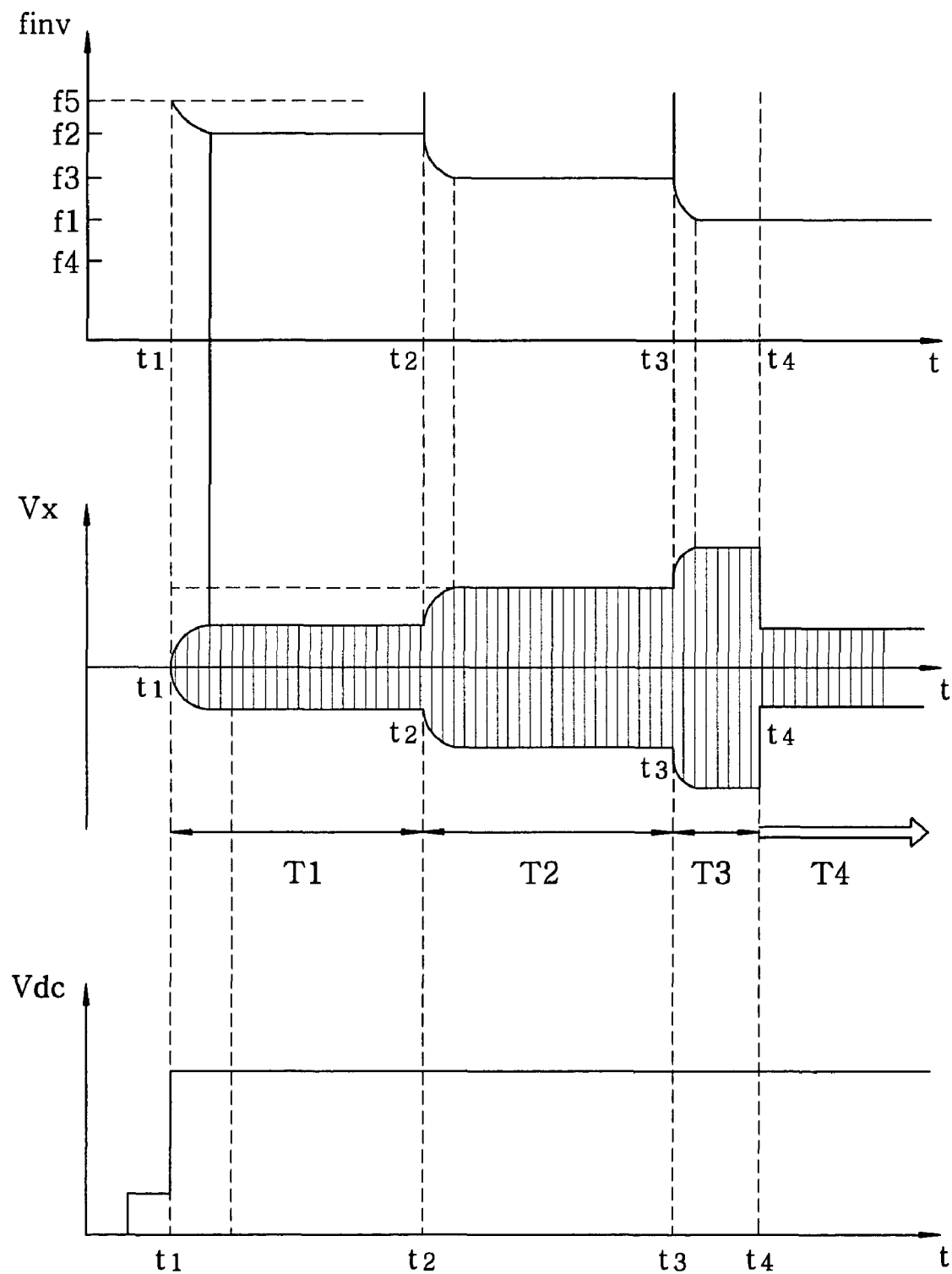
FIG. 20 is an explanatory view illustrating the operation of the lighting device of the seventh embodiment.

With this configuration, the switch SW100 is turned off at the time of transition to the first startup preparation period T1, whereby the operation frequency finv is more gradually decreased and the coil voltage Vx is more gradually increased than in the fourth embodiment. In other words, the coil voltage Vx can be gradually increased by gradually decreasing the operation frequency finv at the time of transition to the first startup preparation period T1, the second startup preparation period T2 and the startup period T3 (see FIGS. 19 and 20).

Eighth Embodiment

Since the basic configuration of the eighth embodiment is common to that of the fourth embodiment, the common parts are designated by like reference characters and will be omitted from description.

Figure 21:
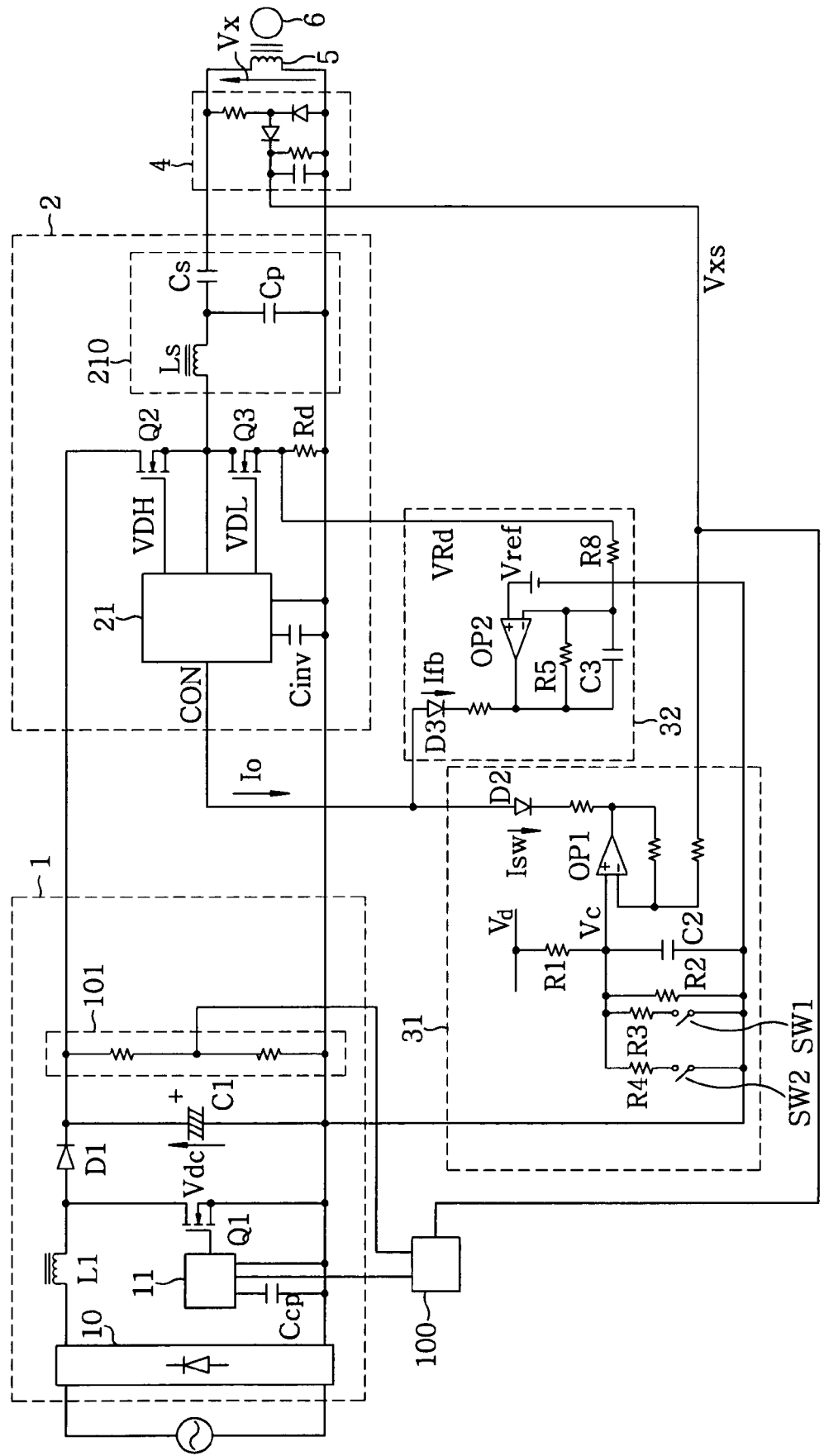
FIG. 21 is a circuit block diagram showing an induction lamp lighting device in accordance with an eighth embodiment of the present invention.

In the present embodiment, the coil voltage Vx is controlled to stay constant by feeding back the detection voltage Vxs outputted from the voltage detection circuit 4. As shown in FIG. 21, a control unit 100 is connected to the voltage control unit 11 of the direct current power supply circuit 1 and the voltage detection circuit 4. Depending on the detection voltage Vxs outputted from the voltage detection circuit 4, the control unit 100 controls the direct current voltage Vdc so that the coil voltage Vx can be kept at a specified constant value. This makes it possible to eliminate the influence caused by the variations of parts or the metal housing of a coupler portion. In addition, the startup performance of the induction lamp 6 can be improved by keeping the coil voltage Vx constant.

Figure 22:
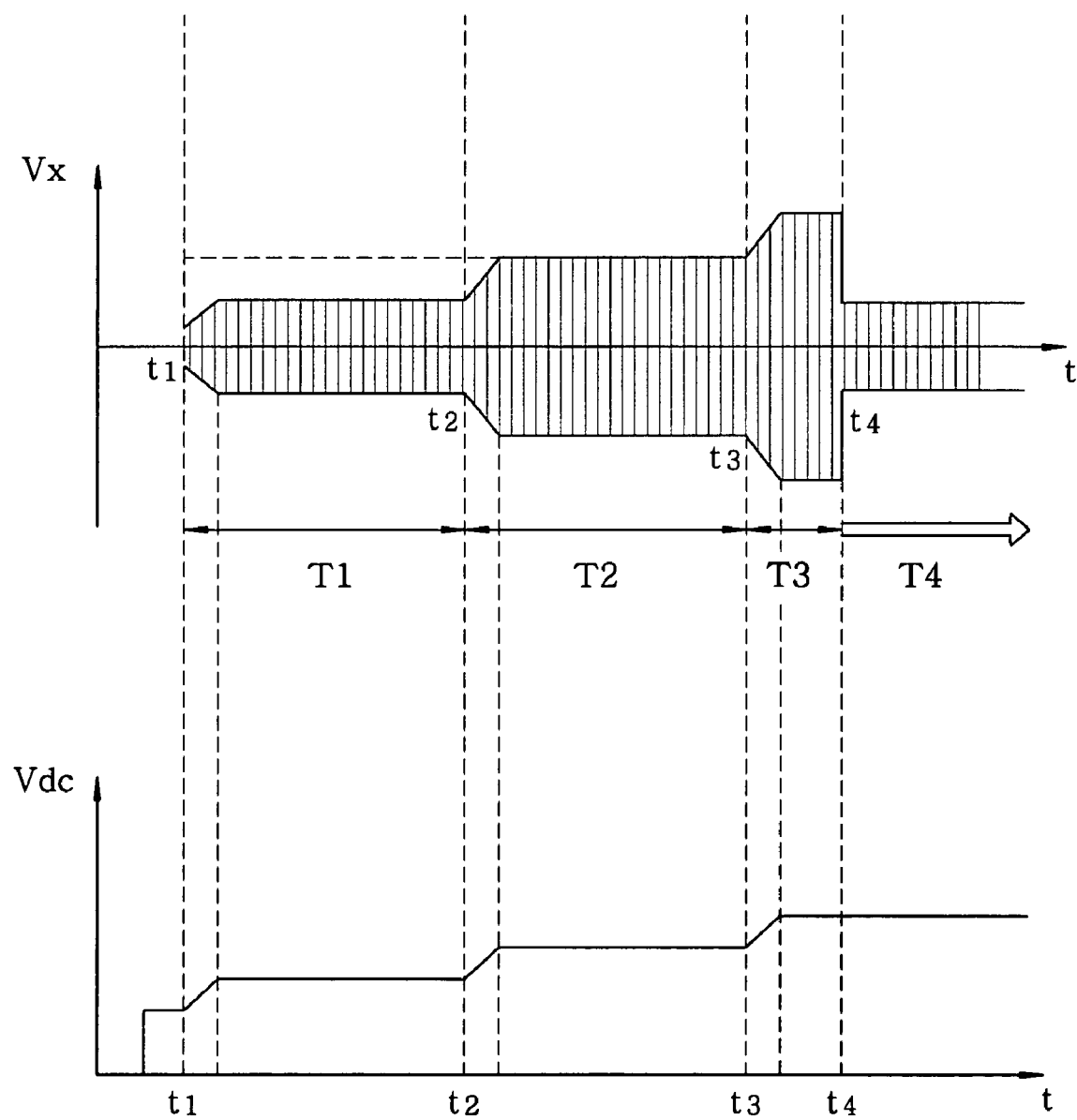
FIG. 22 is an explanatory view illustrating the operation of the lighting device of the eighth embodiment.

Referring to FIG. 22, the coil voltage Vx is gradually increased by gradually increasing the output voltage Vdc of the direct current power supply circuit 1 in each of the first startup preparation period T1 and the second startup preparation period T2.

In the respective embodiments described above, the direct current power supply circuit 1 may be other direct current power supply circuits well-known in the art, such as a boost-setback converter which is the combination of a setback converter and a boost converter. As the power supply of the direct current power supply circuit 1, it may be possible to use a battery in place of the alternating current power supply AC, in which case the diode bridge DB can be omitted. Moreover, an integrated circuit well-known in the art may be used as the control circuit 3.

Figure 23:
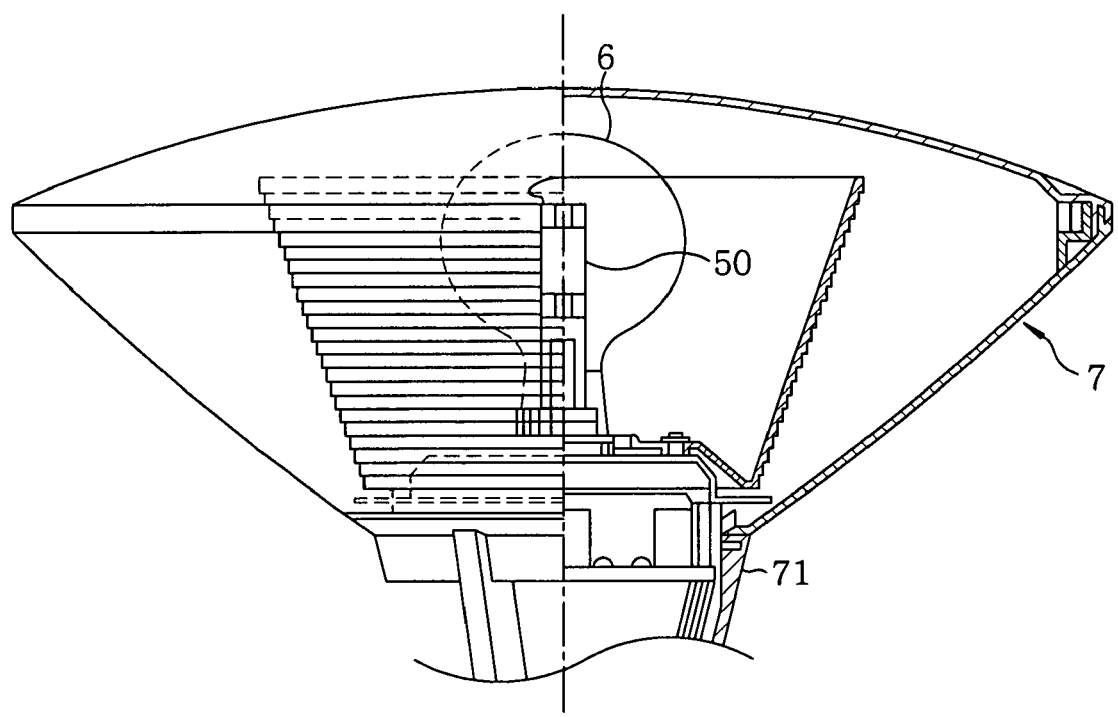
FIG. 23 is a partially cut-away front view showing one example of the illumination apparatus provided with the present lighting device.
Figure 24:
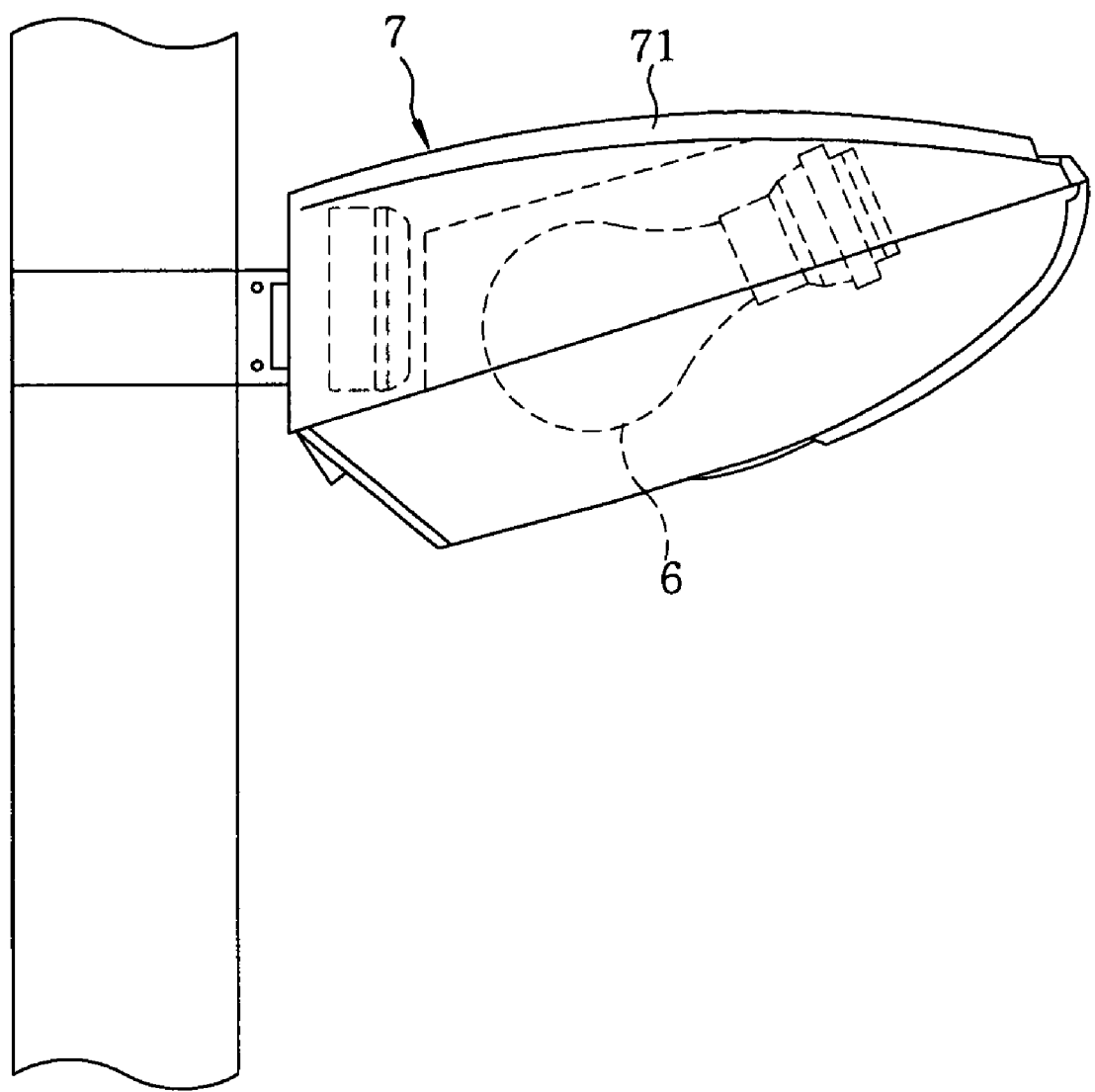
FIG. 24 is a front view showing another example of the illumination apparatus provided with the present lighting device.

With the induction lamp lighting device of the foregoing embodiments, an illumination apparatus 7 can be formed by, e.g., holding the induction lamp 6 and the coupler 50 within a housing 71 of suitable shape as shown in FIGS. 23 and 24. The housing 71 and the illumination apparatus 7 can be realized by the well-known technology and, therefore, will be omitted from detailed illustration and description.

Figure 25A:
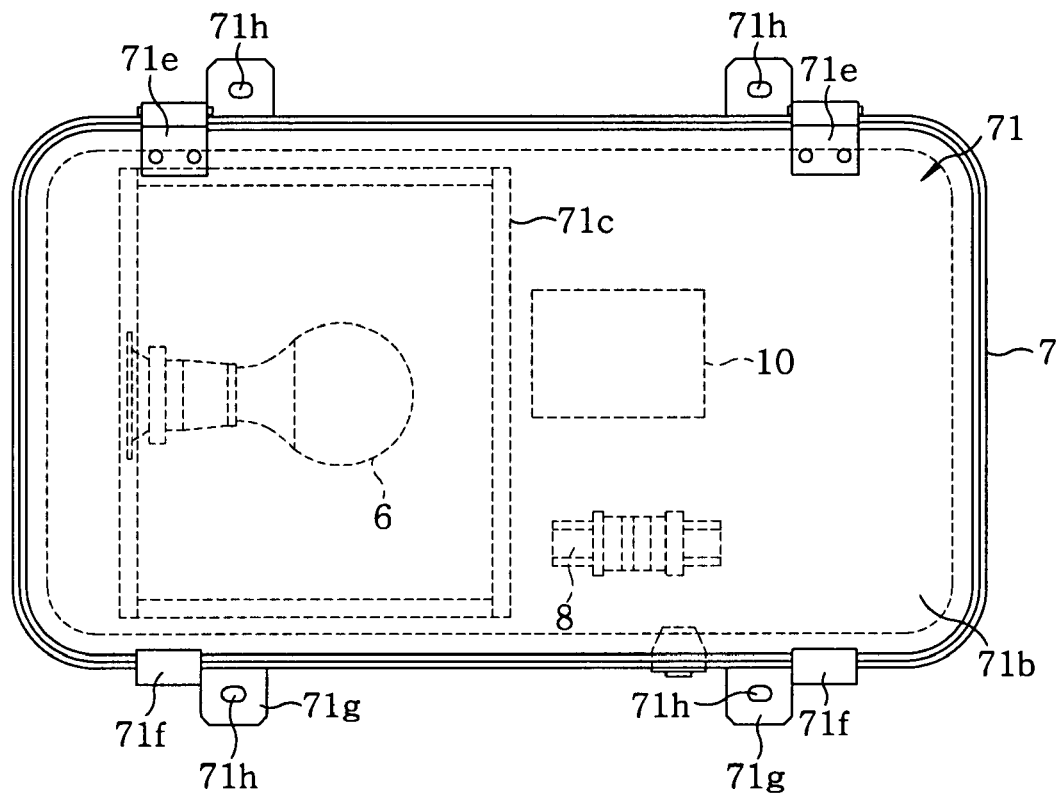
FIGS. 25A, 25B and 25C are front, bottom and left side views showing a further example of the illumination apparatus provided with the present lighting device.
Figure 25B:
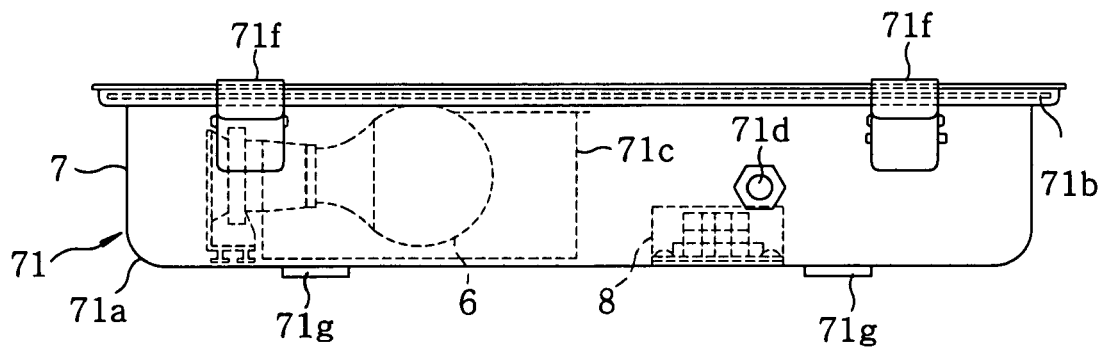
Figure 25C:
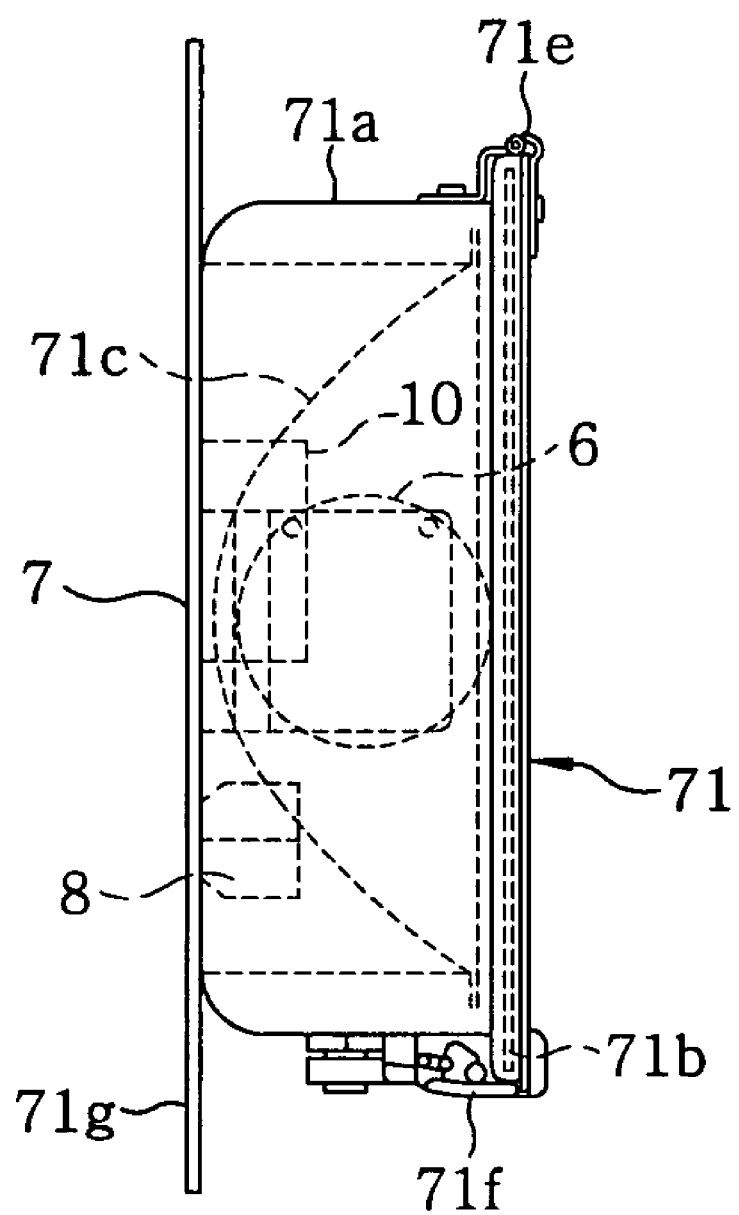

As compared to a discharge lamp having an electrode mounted therein, the induction lamp 6 has a prolonged lifespan and is less susceptible to damage. Therefore, it is preferred that the induction lamp 6 is used as a light source of an illumination apparatus arranged in a hard-to-maintain place such as a tunnel or the like. The induction lamp lighting device described above may be used in an illumination apparatus 7 for tunnel illumination having the structure as shown in FIGS. 25A through 25C. Hereinafter, the illumination apparatus 7 will be described in detail with reference to FIGS. 25A through 25C. The terms "vertical" and "transverse" used herein refer to the directions in FIG. 25A. The vertical direction in FIG. 25C is referred to as a back-and-forth direction.

As shown in FIGS. 25A through 25C, the illumination apparatus 7 is provided with a housing 71 that includes a rectangular body 71a made of, e.g., stainless steel, and opened at its front end, and a cover 71b made of, e.g., a transparent material such as tempered glass or the like, and designed to openably close the body 71a. Fixed to the inner bottom surface of the body 71a is a reflector plate 71c of U-shape in cross section for directing the light of the induction lamp 6 in the forward direction. The reflector plate 71c is made of, e.g., aluminum. The light of the induction lamp 6 accommodated within the housing 71 is projected forwards through the cover 71b. Also fixed to the inner bottom surface of the body 71a are the coupler 50 for attachment of the induction lamp 6, the case 10 for holding the induction lamp lighting device therein, and a terminal base 8 electrically connected to the direct current power supply circuit 1 within the case 10. An electric wire (not shown) is connected at one end to the alternating current power supply AC and at the other end to the terminal base 8. Thus, the direct current power supply circuit 1 is electrically connected to the alternating current power supply AC through the electric wire and the terminal base 8. A wire insertion hole 71d through which to pass the electric wire connected to the terminal base 8 is formed in the lower wall of the body 71a to extend in the vertical direction. The cover 71b is connected at top end to the upper end portion of the body 71a through a hinge 71e. Therefore, the cover 71b is rotatable relative to the body 71a within a transverse plane between a closed position in which the body 71a is kept closed as shown in FIGS. 25A through 25C and an open position in which the body 71a is opened forwards. A latch 71f for locking the end portion of the cover 71b in the closed position is installed at the lower end of the body 71a. The hinge 71e and the latch 71f can be realized by the well-known technology and, therefore, will be omitted from detailed illustration and description. Two installation legs 71g used in fixing the housing 71 to an installation surface (not shown) such as a wall surface or the like are attached to the rear surface of the body 71a in a transversely spaced-apart relationship. The installation legs 71g are made of, e.g., a steel plate. The upper and lower end portions of each of the installation legs 71g protrude upwards and downwards away from the body 71a. A screw insertion hole 71h extending in the back-and-forth direction is formed in each of the protruding portions of the installation legs 71g. The housing 71 is fixed to an installation surface by means of screws (not shown) each inserted into the screw insertion hole 71h and threadedly coupled to the installation surface.

In the various kinds of illumination apparatuses 7 described above, a battery (not shown) may be contained within the housing 71 so that the direct current power supply circuit 1 can use the battery as a power supply at the time of failure of a commercial power supply. The illumination apparatuses 7 can be realized by the well-known technology and, therefore, will be omitted from detailed illustration and description.

While the invention has been shown and described with respect to the preferred embodiments, it will be understood by those skilled in the art that various changes and modification may be made without departing from the scope of the invention as defined in the following claims.

What is claimed is:

1. An induction lamp lighting device, comprising:
   an induction coil arranged adjacent to an induction lamp;
   a direct current power supply circuit for outputting a direct current voltage;
   a high-frequency power supply circuit for converting the direct current voltage to an alternating current voltage and supplying the alternating current voltage to the induction coil; and
   a control circuit for controlling the direct current power supply circuit and the high-frequency power supply circuit, wherein the control circuit is configured to perform a startup preparation operation by which to control the high-frequency power supply circuit so that, immediately after the alternating current voltage begins to be outputted from the high-frequency power supply circuit to the induction coil, the alternating current voltage is gradually increased to such a voltage value as not to generate arc discharge in the induction lamp and then kept at the voltage value for a specified time, wherein the control circuit is configured to perform a startup operation by which to control the high-frequency power supply circuit so that, after termination of the startup preparation operation, the alternating current voltage is gradually increased to a specified voltage value and then kept at the specified voltage value until the induction lamp is lighted up, and wherein the induction lamp lighting device further comprises a voltage detection circuit for outputting a detection voltage whose value grows higher as the amplitude of the alternating current voltage becomes greater, and wherein, during the startup preparation operation and based on the detection voltage, the control circuit is configured to perform a feedback control operation by which the alternating current voltage is kept constant.

2. An induction lamp lighting device, comprising:

an induction coil arranged adjacent to an induction lamp;

a direct current power supply circuit for outputting a direct current voltage;

a high-frequency power supply circuit for converting the direct current voltage to an alternating current voltage and supplying the alternating current voltage to the induction coil; and a control circuit for controlling the direct current power supply circuit and the high-frequency power supply circuit, wherein the control circuit is configured to perform a startup preparation operation by which to control the high-frequency power supply circuit so that, immediately after the alternating current voltage begins to be outputted from the high-frequency power supply circuit to the induction coil, the alternating current voltage is gradually increased to such a voltage value as not to generate arc discharge in the induction lamp and then kept at the voltage value for a specified time, wherein the control circuit is configured to perform a startup operation by which to control the high-frequency power supply circuit so that, after termination of the startup preparation operation, the alternating current voltage is gradually increased to a specified voltage value and then kept at the specified voltage value until the induction lamp is lighted up, and wherein the induction lamp lighting device further comprises a protection circuit for detecting an abnormality in supplying the alternating current voltage from the high-frequency power supply circuit to the induction coil and for consecutively repeating at least the startup preparation operation and the startup operation upon detection of the abnormality, the protection circuit being configured to start the startup preparation operation again until the direct current voltage dropped after detection of the abnormality is increased to a specified value.

3. The induction lamp lighting device of claim 1, further comprising a protection circuit for detecting an abnormality in supplying the alternating current voltage from the high-frequency power supply circuit to the induction coil and for consecutively repeating at least the startup preparation operation and the startup operation upon detection of the abnormality, the protection circuit being configured to start the startup preparation operation again until the direct current voltage dropped after detection of the abnormality is increased to a specified value.

4. The induction lamp lighting device of any one of claims 1, 3 and 2, wherein the startup preparation operation includes at least a first startup preparation operation and a second startup preparation operation performed after termination of the first startup preparation operation, the first startup preparation operation being performed at least until the alternating current voltage reaches a specified value, the high-frequency power supply circuit being configured to, in the first startup preparation operation, supply the induction coil with a high-frequency voltage great enough to apply load to the direct current power supply circuit so that the direct current voltage outputted from the direct current power supply circuit does not exceed a specified voltage, the high-frequency power supply circuit being configured to, in the second startup preparation operation, supply the induction coil with a high-frequency voltage which is greater than the alternating current voltage outputted to the induction coil in the first startup preparation operation and which is set as high as possible within the extent of not starting up the induction lamp, the control circuit being configured to perform a control operation so that the high-frequency voltage supplied to the induction coil is gently increased when the first startup preparation operation proceeds to the second startup preparation operation.

5. The induction lamp lighting device of claim 4, wherein the control circuit is configured to perform a control operation so that, in the second startup preparation operation, a high-frequency electric field discharge voltage for generation of high-frequency electric field discharge is applied to the induction coil until the high-frequency electric field discharge is generated and so that, in the startup operation, a high-frequency electromagnetic field discharge voltage for generation of high-frequency electromagnetic field discharge is applied to the induction coil.

6. The induction lamp lighting device of any one of claims 1, 3 and 2, wherein the startup preparation operation is performed by gradually reducing an operation frequency.

7. An illumination apparatus comprising the induction lamp lighting device of claim 6.

8. The induction lamp lighting device of any one of claims 1, 3 and 2, wherein the startup preparation operation is performed by gradually increasing the direct current voltage outputted from the direct current power supply circuit.

9. An illumination apparatus comprising the induction lamp lighting device of claim 8.

* * * * *